(12) United States Patent
Jia et al.

(10) Patent No.: US 11,422,341 B2
(45) Date of Patent: Aug. 23, 2022

(54) CAMERA LENS ASSEMBLY

(71) Applicant: Zhejiang Sunny Optical Co., Ltd., Ningbo (CN)

(72) Inventors: Yuanlin Jia, Ningbo (CN); Kaiyuan Zhang, Ningbo (CN); Biao Xu, Ningbo (CN)

(73) Assignee: ZHEJIANG SUNNY OPTICAL CO., LTD, Zhejiang (CN)

(*) Notice: Subject to any disclaimer, the term of this patent is extended or adjusted under 35 U.S.C. 154(b) by 0 days.

(21) Appl. No.: 16/614,079

(22) PCT Filed: Nov. 20, 2018

(86) PCT No.: PCT/CN2018/116308
§ 371 (c)(1),
(2) Date: Nov. 15, 2019

(87) PCT Pub. No.: WO2019/223263
PCT Pub. Date: Nov. 28, 2019

(65) Prior Publication Data
US 2021/0286152 A1  Sep. 16, 2021

(30) Foreign Application Priority Data
May 25, 2018 (CN) .......................... 201810560630.2

(51) Int. Cl.
G02B 13/00 (2006.01)
G02B 9/62 (2006.01)
(Continued)

(52) U.S. Cl.
CPC ........... G02B 13/0045 (2013.01); G02B 9/62 (2013.01); G02B 27/0025 (2013.01); G02B 5/005 (2013.01); G02B 13/18 (2013.01)

(58) Field of Classification Search
CPC .. G02B 13/0045; G02B 9/62; G02B 27/0025; G02B 5/005; G02B 13/18
(Continued)

(56) References Cited

U.S. PATENT DOCUMENTS 8,743,477 B2  6/2014 Tsai et al.
9,235,031 B2  1/2016 Chung et al.
(Continued)

FOREIGN PATENT DOCUMENTS

CN  101295070 A  10/2008
CN  101339290 A  1/2009
(Continued)

OTHER PUBLICATIONS

Translation of Office Action dated Apr. 9, 2021, in connection with Indian Patent Application No. 201917046216.

Primary Examiner — Evelyn A Lester
(74) Attorney, Agent, or Firm — Norris McLaughlin, P.A.

(57) ABSTRACT

A camera lens assembly, sequentially from an object side to an image side along an optical axis, includes: a first lens having a negative refractive power; a second lens having a positive refractive power, an object-side surface thereof is a convex surface, and an image-side surface thereof is a concave surface; a third lens having a positive refractive power, and an object-side surface thereof is a convex surface; a fourth lens having a negative refractive power, and an image-side surface thereof is a concave surface; a fifth lens having a positive refractive power; and a sixth lens having a negative refractive power, and at least one of an object-side surface and an image-side surface thereof has an inflection point. Half of a maximal field-of-view HFOV of the camera lens assembly satisfies: HFOV≥55°.

18 Claims, 11 Drawing Sheets

(51) Int. Cl.
*G02B 27/00* (2006.01)
*G02B 13/18* (2006.01)
*G02B 5/00* (2006.01)

(58) Field of Classification Search
USPC .......................... 359/713, 740, 752, 756, 761
See application file for complete search history.

(56) References Cited

U.S. PATENT DOCUMENTS

| | | | |
|---|---|---|---|
| 9,927,597 B2 | 3/2018 | Lee et al. | |
| 9,964,739 B1 | 5/2018 | Shi | |
| 10,156,703 B2 | 12/2018 | Jung | |
| 10,345,558 B2 | 7/2019 | Shih | |
| 2008/0049335 A1 | 2/2008 | Tomioka | |
| 2009/0009884 A1 | 1/2009 | Ohtake et al. | |
| 2014/0118844 A1 | 5/2014 | Tsai et al. | |
| 2014/0211326 A1 | 7/2014 | Lai | |
| 2015/0098137 A1 | 4/2015 | Chung et al. | |
| 2015/0346460 A1* | 12/2015 | Chen | G02B 13/0045 359/713 |
| 2016/0161717 A1* | 6/2016 | Chae | G02B 13/0045 359/713 |
| 2016/0178871 A1* | 6/2016 | You | G02B 13/0045 359/713 |
| 2016/0223796 A1 | 8/2016 | Lee et al. | |
| 2017/0276909 A1* | 9/2017 | Jung | G02B 9/62 |
| 2018/0011299 A1* | 1/2018 | Lin | G02B 9/62 |
| 2018/0143405 A1 | 5/2018 | Hsueh et al. | |
| 2019/0204545 A1* | 7/2019 | Oinuma | G02B 13/0045 |
| 2021/0286152 A1 | 9/2021 | Jia et al. | |

FOREIGN PATENT DOCUMENTS

| | | |
|---|---|---|
| CN | 103353668 A | 10/2013 |
| CN | 103792646 A | 5/2014 |
| CN | 104516090 A | 4/2015 |
| CN | 105842823 A | 8/2016 |
| CN | 106199912 A | 12/2016 |
| CN | 106324810 A | 1/2017 |
| CN | 107065125 A | 8/2017 |
| CN | 107203033 A | 9/2017 |
| CN | 207074300 U | 3/2018 |
| CN | 108469669 A | 8/2018 |

* cited by examiner

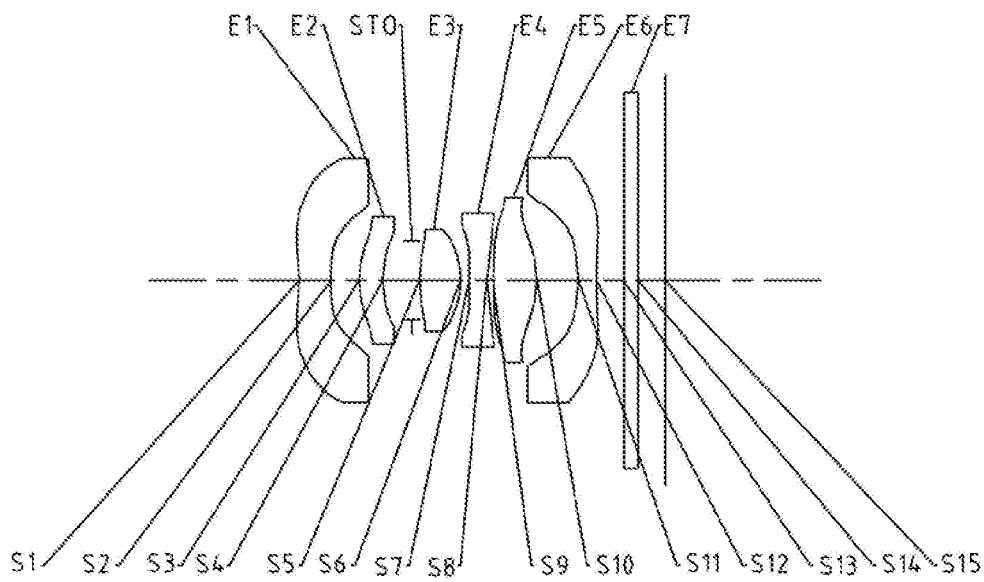
Fig. 13
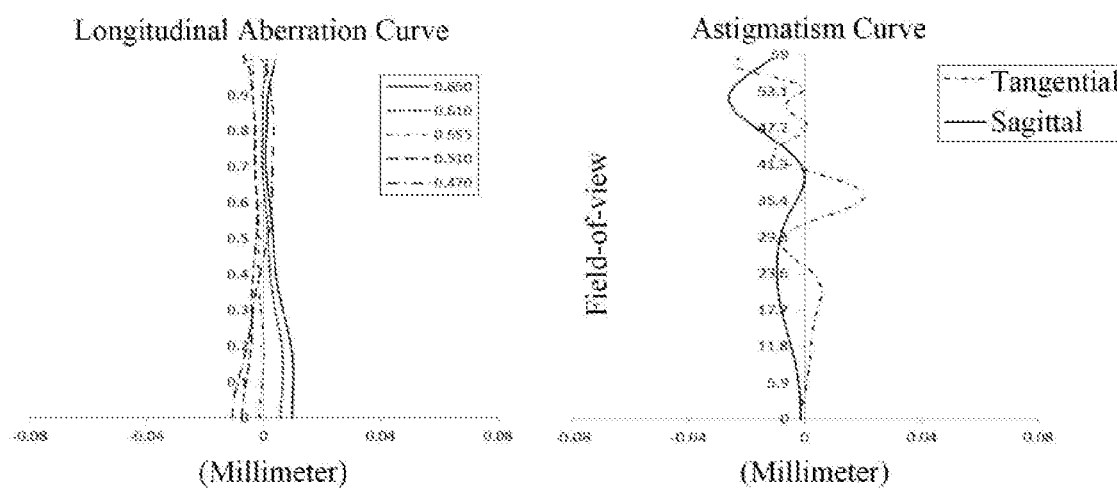
Fig. 14A
Fig. 14B

CAMERA LENS ASSEMBLY

CROSS-REFERENCE TO RELATED APPLICATION

This application is a 371 of PCT/ CN2018/116308, filed Nov. 20, 2018, which claims the priority from Chinese Patent Application No. 201810560630.2, filed in the National Intellectual Property Administration (CNIPA) on May 25, 2018, the disclosure of which is hereby incorporated by reference in its entirety.

TECHNICAL FIELD

The present disclosure relates to a camera lens assembly, and more specifically to a camera lens assembly including six lenses.

BACKGROUND

With the diversified development of smart phones, consumers are increasingly demanding the camera function of smart phones. The camera functions of most high-end mobile phones on the market show more and more excellent performance. In order to meet the needs of the market, camera lens assemblies of the mobile phone not only need to have high pixel, high resolution, high relative brightness and the like, but also need to have a larger field-of-view. At the same time, camera lens assemblies should have miniaturization features to meet the ultra-thin development requirements of smart products.

SUMMARY

The present disclosure provides a camera lens assembly that at least solves or partially addresses at least one of the above disadvantages of the prior art.

In one aspect, the present disclosure provides a camera lens assembly including, sequentially from an object side to an image side along an optical axis, a first lens, a second lens, a third lens, a fourth lens, a fifth lens and a sixth lens. The first lens may have a negative refractive power; the second lens may have a positive refractive power, an object-side surface thereof maybe a convex surface and an image-side surface thereof maybe a concave surface; the third lens has a positive refractive power, and an object-side surface thereof maybe a convex surface; the fourth lens has a negative refractive power, and an image-side surface thereof may be a concave surface; the fifth lens may have a positive refractive power; and the sixth lens may have a negative refractive power, and at least one of an object-side surface and an image-side surface thereof may have an inflection point. Half of a maximal field-of-view HFOV of the camera lens assembly HFOV may satisfy HFOV≥55°; and a spaced distance T45 of the fourth lens and the fifth lens on the optical axis and a combined focal length f45 of the fourth lens and the fifth lens may satisfy 0<T45/f45×10<0.5.

In an implementation, a total effective focal length f of the camera lens assembly and a center thickness CT3 of the third lens on the optical axis satisfy 3<f/CT3<5.

In an implementation, half of a maximal field-of-view HFOV of the camera lens assembly HFOV may satisfy HFOV≥55°.

In an implementation, a sum of center thicknesses 93 CT of the first to sixth lenses on the optical axis, a radius of curvature R3 of the object-side surface of the second lens, and a radius of curvature R4 of the image-side surface of the second lens may satisfy 7<ΣCT×(R3+R4)<11.

In an implementation, a total effective focal length f of the camera lens assembly and a combined focal length f123 of the first lens, the second lens and the third lens may satisfy f/f123<2.5.

In an implementation, a maximum effective radius DT12 of an image-side surface of the first lens and an axial distance SAG12 from an intersection of the image-side surface of the first lens and the optical axis to an apex of an effective radius of the image-side surface of the first lens may satisfy 1<DT12/SAG12<3.

In an implementation, a total effective focal length f of the camera lens assembly, a combined focal length f34 of the third lens and the fourth lens, and the combined focal length f56 of the fifth lens and the sixth lens may satisfy |f/f34|+|f/f56|<2.

In an implementation, an axial distance SAG52 from an intersection of an image-side surface of the fifth lens and the optical axis to an apex of an effective radius of the image-side surface of the fifth lens and an center thickness CT5 of the fifth lens on the optical axis may satisfy |SAG52|/CT5<1.

In an implementation, a center thickness CT3 of the third lens on the optical axis and a center thickness CT6 of the sixth lens on the optical axis may satisfy 0<CT3/CT6<3.

In an implementation, a radius of curvature R5 of the object-side surface of the third lens and a curvature radius R8 of the image-side surface of the fourth lens may satisfy |R5−R8|/R5+R8|<1.

In an implementation, half of a diagonal length ImgH of an effective pixel area on an image plane of the camera lens assembly and a maximum effective radius DT52 of an image-side surface of the fifth lens may satisfy 1<ImgH/DT52<4.

In another aspect, the present disclosure provides a camera lens assembly including, sequentially from an object side to an image side along an optical axis, a first lens, a second lens, a third lens, a fourth lens, a fifth lens and a sixth lens. The first lens may have a negative refractive power; the second lens may have a positive refractive power, an object-side surface thereof may be a convex surface and an image-side surface thereof may be a concave surface; the third lens has a positive refractive power, and an object-side surface thereof may be a convex surface; the fourth lens has a negative refractive power, and an image-side surface thereof may be a concave surface; the fifth lens may have a positive refractive power; and the sixth lens may have a negative refractive power, and at least one of an object-side surface and an image-side surface thereof may have an inflection point. A total effective focal length f of the camera lens assembly and a center thickness CT3 of the third lens on the optical axis may satisfy 3<f/CT3<5; and a distance TTL on the optical axis from an object-side surface of the first lens to an image plane of the camera lens assembly and half of a diagonal length ImgH of an effective pixel area on the image plane of the camera lens assembly may satisfy: 1.6<TTL/ImgH<2.

In another aspect, the present disclosure provides a camera lens assembly including, sequentially from an object side to an image side along an optical axis, a first lens, a second lens, a third lens, a fourth lens, a fifth lens and a sixth lens. The first lens may have a negative refractive power; the second lens may have a positive refractive power, an object-side surface thereof may be a convex surface and an image-side surface thereof may be a concave surface; the third lens has a positive refractive power, and an object-side surface thereof may be a convex surface; the fourth lens has a negative refractive power, and an image-side surface thereof may be a concave surface; the fifth lens may have a positive refractive power; and the sixth lens may have a negative refractive power, and at least one of an object-side surface and an image-side surface thereof may have an inflection point. A total effective focal length f of the camera lens assembly and a center thickness CT3 of the third lens on the optical axis may satisfy 3<f/CT3<5; and a sum of center thicknesses ΣCT of the first to sixth lenses on the optical axis, a radius of curvature R3 of the object-side surface of the second lens, and a radius of curvature R4 of the image-side surface of the second lens may satisfy Σ7<ΣCT×(R3+R4)<11.

The present disclosure employs six lenses, and the camera lens assembly has at least one advantageous effect such as ultra-thin, large field of view, high image quality and low sensitivity and the like by rationally distributing the refractive power, the surface shape, the center thickness of each lens, and the axial spaced between the lenses and the like.

BRIEF DESCRIPTION OF THE DRAWINGS

Other features, purpose and advantages of the present disclosure will become apparent through the detailed description of the non-limiting implementations given in conjunction with the accompanying drawings. In the drawings:

FIG. 13 illustrates a schematic structural view of a camera lens assembly according to embodiment 7 of the present disclosure;

FIGS. 14A to 14D illustrate a longitudinal aberration curve, an astigmatic curve, a distortion curve and a lateral color curve of the camera lens assembly of the embodiment 7, respectively.

DETAILED DESCRIPTION OF EMBODIMENTS

Figure 1:
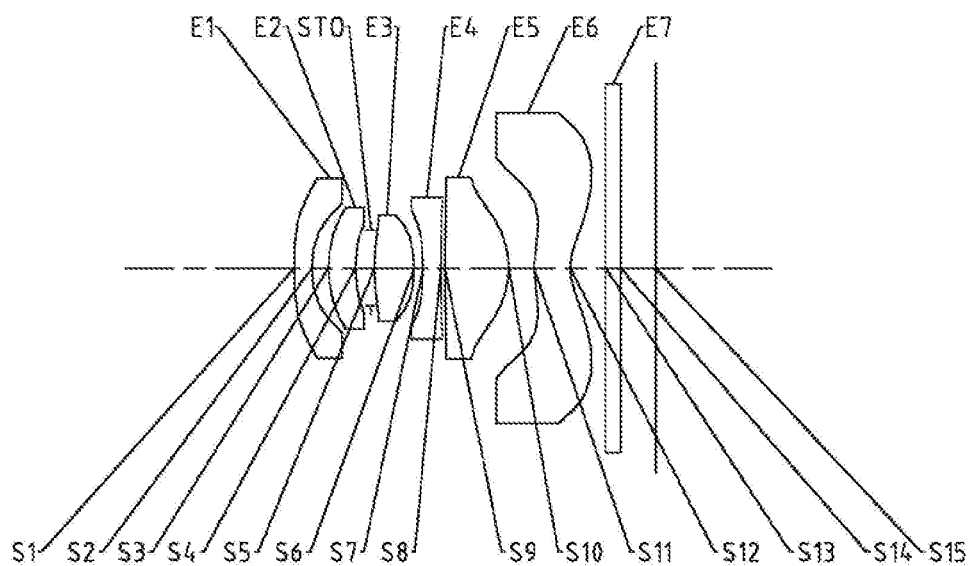
FIG. 1 illustrates a schematic structural view of a camera lens assembly according to embodiment 1 of the present disclosure.

For a better understanding of the present disclosure, various aspects of the present disclosure will be described in more detail with reference to the drawings. It should be understood that the detailed descriptions are merely used for describing exemplary embodiments of the present disclosure, but not intend to limit the scope of the present disclosure. Throughout the specification, the same reference numerals designate the same elements. The expression "and/or" includes any and all combinations of one or more of the associated listed items.

It should be noted that, in the present specification, the expressions such as first, second and third are merely for distinguishing one feature from another feature without limiting the feature. Thus, a first lens discussed below could be referred to as a second lens or a third lens without departing from the teachings of the present disclosure.

In the accompanying drawings, for convenience of explanation, thicknesses, sizes and shapes of lenses have been slightly exaggerated. Specifically, spherical or aspheric shapes shown in the accompanying drawings are shown byway of examples. That is, spherical or aspheric shapes are not limited to the spherical or aspheric shapes shown in the accompanying drawings. The accompanying drawings are merely examples, and not strictly drawn to scale.

Herein, a paraxial area refers to an area near the optical axis. If a surface of a lens is a convex surface and the position of the convex is not defined, it indicates that the surface of the lens is convex at least in the paraxial area; if a surface of a lens is a concave surface and the position of the concave is not defined, it indicates that the surface of the lens is concave at least in the paraxial area. In each lens, the surface closest to the object side is referred to as an object-side surface; and in each lens, the surface closest to the image side is referred to as an image-side surface.

It should be further understood that the terms "comprising," "including," "having," "containing" and/or "contain," when used in the specification, specify the presence of stated features, elements, and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing implementations of the present disclosure, refers to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the embodiments in the present disclosure and the features in the embodiments may be combined with each other on a non-conflict basis. The present disclosure will be described in detail below with reference to the accompanying drawings and in combination with the embodiments.

The features, principles, and other aspects of the present disclosure are described in detail below.

A camera lens assembly according to exemplary implementations of the present disclosure may include, for example, six lenses having a refractive power, i.e., a first lens, a second lens, a third lens, a fourth lens, a fifth lens and a sixth lens. The six lenses are sequentially arranged from an object side to an image side along an optical axis, and any two adjacent lenses among the six lenses have an air gap therebetween.

In an exemplary implementation, the first lens may have a negative refractive power; the second lens may have a positive refractive power, an object-side surface thereof may be a convex surface and an image-side surface thereof maybe a concave surface; the third lens has a positive refractive power, an object-side surface thereof may be a convex surface; the fourth lens has a negative refractive power, and an image-side surface thereof may be a concave surface; the fifth lens may have a positive refractive power; and the sixth lens may have a negative refractive power, and at least one of the object-side surface and image-side surface thereof may have at least one inflection point.

In an exemplary implementation, the image-side surface of the third lens may be a convex surface.

In an exemplary implementation, the image-side surface of the fifth lens may be a convex surface.

In an exemplary implementation, the camera lens assembly according to the present disclosure may satisfy: HFOV≥55°, where HFOV is half of the maximal field-of-view of the camera lens assembly. More specifically, HFOV may further satisfy: 58.1°≥HFOV58.6°. By optimizing the camera lens assembly, the maximal field-of-view of the system is controlled to be greater than 110 degrees to achieve wide-angle characteristics of the system.

In an exemplary implementation, the camera lens assembly according to the present disclosure may satisfy: 3<f/CT3<5, where f is a total effective focal length of the camera lens assembly, and CT3 is a center thickness of the third lens on the optical axis. More Specifically, f and CT3 may further satisfy: 3<f/CT3<4, for example, 3.23≤f/CT3≤3.97. By limiting the ratio of the total effective focal length of the camera lens assembly to the center thickness of the third lens on the optical axis, the processing characteristics of the third lens and the spherical aberration contribution rate of the third lens can be reasonably ensured, so as to ensure the system has a good imaging performance on the axis.

In an exemplary implementation, the camera lens assembly according to the present disclosure may satisfy: 7<ΣCT×(R3+R4)<11, where ΣCT is a sum of center thicknesses of the first lens to the sixth lens on the optical axis, R3 is a radius of curvature of the object-side surface of the second lens, and R4 is a radius of curvature of the image-side surface of the second lens. More Specifically, ΣCT, R3 and R4 may further satisfy: 7.63≤ΣCT×(R3+R4)≤10.68. By limiting the ratio of the sum of the center thicknesses of the first lens to the sixth lens on the optical axis of the camera lens assembly to the sum of the radii of curvature of the object-side surface and the image-side surface of the second lens, the amount of astigmatism contribution of the second lens to the camera lens assembly can be reasonably controlled.

In an exemplary implementation, the camera lens assembly according to the present disclosure may satisfy: 1.6<TTL/ImgH<2, where TTL is a distance on the optical axis from the object-side surface of the first lens to the image plane of the camera lens assembly, and ImgH is half of a diagonal length of an effective pixel area on the image plane of the camera lens assembly. More specifically, TTL and ImgH may further satisfy: 1.7<TTL/ImgH<1.9, for example, 1.77≤TTL/ImgH≤1.79. By controlling the ratio of the total track length of the camera lens assembly to the image height, the ultra-thin and high-pixel characteristics of the camera lens assembly can be achieved.

In an exemplary implementation, the camera lens assembly according to the present disclosure may satisfy: |f/f34|+|f/f56|<2, where f is a total effective focal length of the camera lens assembly, f34 is a combined focal length of the third lens and the fourth lens, and f56 is a combined focal length of the fifth lens and the sixth lens. More specifically, f, f34 and f56 may further satisfy: |f/f54|+f/f56|<1.5, for example, 1.24≤|f/f34|+|f/f56|≤1.37.By limiting f34 and f56 within a certain range, the refractive power of the system can be reasonably distributed to make the system has good imaging quality and the sensitivity of the system can be reduced effectively.

In an exemplary implementation, the camera lens assembly according to the present disclosure may satisfy: 1<DT12/SAG12<3, where DT12 is a maximum effective radius of the image-side surface of the first lens, and SAG12 is an axial distance from an intersection of the image-side surface of the first lens and the optical axis to an apex of the effective radius of the image-side surface of the first lens. More specifically, DT12 and SAG12 may further satisfy: 1.8<DT12/SAG12<2.6, for example, 1.96≤DT12/SAG12≤2.44. When the conditional expression 1<DT12/SAG12<3 is satisfied, the incident angle of the chief ray on the image-side surface of the first lens can be reasonably controlled, so that the incident angle of the chief ray and the chip of the lens assembly have better matching.

In an exemplary implementation, the camera lens assembly according to the present disclosure may satisfy: f/f123<2.5, where f is a total effective focal length of the camera lens assembly, and f123 is a combined focal length of the first lens, the second lens, and the third lens. More specifically, f and f123 may further satisfy: 1<f/f123<1. 6, for example, 1.15f/f123<1.48. By reasonably controlling the ratio of f to f123, the amount of aberration contribution of the front group optical lens composed of the first lens to the third lens can be controlled, and the aberration generated by the front group optical lens is balanced with the aberration generated by the rear lens composed of the fourth lens to the sixth lens, so that the total aberration of the system is within a reasonable range.

In an exemplary implementation, the camera lens assembly according to the present disclosure may satisfy: |SAG52|/CT5<1, where SAG52 is an axial distance from an intersection of the image-side surface of the fifth lens and the optical axis to an apex of the effective radius of the image-side surface of the fifth lens, and CT5 is a center thickness of the fifth lens on the optical axis. More specifically, SAG52 and CT5 may further satisfy: 0.3<|SAG52|/CT5<0.7, for example, 0.33|SAG52|/CT5≤0.63. When the conditional expression |SAG52|/CT5<1 is satisfied, the deflection angle from the object-side surface of the fifth lens to an edge of the image-side surface of the fifth lens can be effectively reduced, so that the fifth lens has good processability characteristics.

In an exemplary implementation, the camera lens assembly according to the present disclosure may satisfy: 0<CT3/CT6<3, where CT3 is a center thickness of the third lens on the optical axis, and CT6 is a center thickness of the sixth lens on the optical axis. More specifically, CT3 and CT6 may further satisfy: 0.7<CT3/CT6<2.5, for example, 0.88≤CT3/CT6≤2.28. The center thickness of the lenses affects the system refractive power. By controlling the ratio of CT3 to CT6, the distortion contribution of corresponding field of view of the system can be controlled within a reasonable range, thereby the imaging quality of the system can be improved.

In an exemplary implementation, the camera lens assembly according to the present disclosure may satisfy: |R5−R8|/|R5+R8|<1, where R5 is a radius of curvature of the object-side surface of the third lens, and R8 is a radius of curvature of the image-side surface of the fourth lens. More specifically, R5 and R8 may further satisfy: 0<|R5−R8|/|R5+R8|<0.5, for example, 0.03≤|R5−R8|/|R5+R8|≤0.34. By limiting the ratio of the difference between the radii of curvature of the object-side surface of the third lens and the image-side surface of the fourth lens to the sum of the radii of curvature the object-side surface of the third lens and the image-side surface of the fourth lens within a certain range, the coma of the system can be reduced, so that the system has good imaging quality.

In an exemplary implementation, the camera lens assembly according to the present disclosure may satisfy: 1<ImgH/DT52<4, where ImgH is half of a diagonal length of an effective pixel area on the image plane of the camera lens assembly, and DT52 is a maximum effective radius of the image-side surface of the fifth lens. More specifically, ImgH and DT52 may further satisfy: 2.1<ImgH/DT52<2.8, for example 2.25≤ImgH/DT52≤2.65. By limiting the ratio of the image height of the system to the effective radius of the image-side surface of the fifth lens within a certain range, the aberration of the edge field of view can be effectively reduced, and the imaging quality of the edge field of view can be improved.

In an exemplary implementation, the camera lens assembly according to the present disclosure may satisfy: 0<T45/f45×10<0.5, where T45 is a spaced distance on the optical axis between the fourth lens and the fifth lens, and f45 is a combined focal length of the fourth lens and the fifth lens. More specifically, T45 and f45 may further satisfy: 0.14≤T45/f45×10≤0.37. By limiting the ratio of the combined focal length of the fourth lens and the fifth lens to the air gap between the fourth lens and the fifth lens within a certain range, the refractive powers can be reasonably distributed, while the system has good image quality.

In an exemplary implementation, the camera lens assembly described above may further include at least one diaphragm to enhance the imaging quality of the lens assembly. Alternatively, the diaphragm may be disposed between the second lens and the third lens.

Alternatively, the above camera lens assembly may further include an optical filter for correcting the color deviation and/or a protective glass for protecting the photosensitive element on the image plane.

The camera lens assembly according to the above implementations of the present disclosure may employ a plurality of lenses, such as six lenses as described above. By properly distributing the refractive power of each lens, the surface shape, the center thickness of each lens, and spaced distances on the optical axis between the lenses, the size and the sensitivity of the lens assembly can be effectively reduced, and the workability of the lens assembly can be improved, such that the camera lens assembly is more advantageous for production processing and may be applied to portable electronic products, such as smart phone. At the same time, the camera lens assembly configured as described above also has advantageous effects such as ultra-thin, large field of view, high imaging quality, low sensitivity, and the like.

In the implementations of the present disclosure, at least one of the surfaces of each lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. By using an aspheric lens, the aberrations that occur during imaging can be eliminated as much as possible, and thus improving the image quality.

However, it will be understood by those skilled in the art that the number of lenses constituting the camera lens assembly may be varied to achieve the various results and advantages described in this specification without departing from the technical solution claimed by the present disclosure. For example, although the implementation is described by taking six lenses as an example, the camera lens assembly is not limited to include six lenses. The camera lens assembly may also include other numbers of lenses if desired.

Specific embodiments applicable to the camera lens assembly of the above implementations will be further described below with reference to the accompanying drawings.

Embodiment 1

A camera lens assembly according to embodiment 1 of the present disclosure is described below with reference to FIG. 1 to FIG. 2D. FIG. 1 shows a schematic structural view of the camera lens assembly according to embodiment 1 of the present disclosure.

As shown in FIG. 1, the camera lens assembly according to an exemplary implementation of the present disclosure includes a first lens E1, a second lens E2, a diaphragm STO, a third lens E3, a fourth lens E4, a fifth lens E5, a sixth lens E6, an optical filter E7 and an image plane S15, sequentially from an object side to an image side along an optical axis.

The first lens E1 has a negative refractive power. An object-side surface S1 of the first lens E1 is a convex surface, and an image-side surface S2 of the first lens E1 is a concave surface. The second lens E2 has a positive refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a convex surface. The fourth lens E4 has a negative refractive power. An object-side surface S7 of the fourth lens E4 is a concave surface, and an image-side surface S8 of the fourth lens E4 is a concave surface. The fifth lens E5 has a positive refractive power. An object-side surface S9 of the fifth lens E5 is a convex surface, and an image-side surface S10 of the fifth lens E5 is a convex surface. The sixth lens E6 has a negative refractive power. An object-side surface S11 of the sixth lens E6 is a convex surface, and an image-side surface S12 of the sixth lens E6 is a concave surface. Also, at least one of the object-side surface S11 and the image-side surface S12 of the sixth lens E6 has an inflection point. The optical filter E7 has an object-side surface S13 and an image-side surface S14. Light from an object sequentially passes through the respective surfaces S1 to S14 and is finally imaged on the image plane S15.

Table 1 shows surface type, radius of curvature, thickness, material and conic coefficient of each lens of the camera lens assembly in embodiment 1, wherein the units for the radius of curvature and the thickness are millimeter(mm).

TABLE 1

| Surface number | Surface type | Radius of curvature | Thickness | Material Refractive index | Abbe number | Conic coefficient |
|---|---|---|---|---|---|---|
| OBJ | spherical | infinite | infinite | | | |
| S1 | aspheric | 500.0000 | 0.2500 | 1.54 | 55.7 | −95.0000 |
| S2 | aspheric | 1.9039 | 0.2334 | | | −1.0431 |
| S3 | aspheric | 1.6669 | 0.3801 | 1.67 | 20.4 | 0.777 |
| S4 | aspheric | 2.0686 | 0.2202 | | | 2.8988 |
| STO | spherical | infinite | 0.0500 | | | |
| S5 | aspheric | 3.3629 | 0.5615 | 1.55 | 56.1 | 1.5501 |
| S6 | aspheric | −1.8415 | 0.1261 | | | 2.7743 |
| S7 | aspheric | −11.1904 | 0.2500 | 1.67 | 20.4 | −8.4782 |
| S8 | aspheric | 3.6020 | 0.0604 | | | −14.6854 |
| S9 | aspheric | 18.1391 | 0.9036 | 1.55 | 56.1 | −95.0000 |
| S10 | aspheric | −1.2770 | 0.3541 | | | −0.1756 |
| S11 | aspheric | 1.3658 | 0.5139 | 1.54 | 55.7 | −10.9634 |
| S12 | aspheric | 0.7655 | 0.5028 | | | −3.3450 |

TABLE 1-continued

| Surface number | Surface type | Radius of curvature | Thickness | Material Refractive index | Abbe number | Conic coefficient |
|---|---|---|---|---|---|---|
| S13 | spherical | infinite | 0.2100 | 1.52 | 64.2 | |
| S14 | spherical | infinite | 0.4941 | | | |
| S15 | spherical | infinite | infinite | | | |

As can be seen from Table 1, the object-side surface and the image-side surface of anyone of the first lens E1 to the sixth lens E6 are aspheric. In this embodiment, the surface shape x of each aspheric lens can be defined by using, but not limited to, the following aspheric formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R(that is, the paraxial curvature c is reciprocal of the radius of curvature R in the above Table 1); k is a conic coefficient (given in the above Table 1); Ai is a correction coefficient for the i-th order of the aspheric surface. Table 2 below shows high-order coefficients A4, A6, A8, A10, A12, A16, A18 and A20 applicable to each aspheric surface S1-S12 in embodiment 1.

TABLE 2

| Surface number | A4 | A6 | A8 | A10 | A12 |
|---|---|---|---|---|---|
| S1 | 3.6722E−01 | −4.3604E−01 | 4.6589E−01 | −3.4827E−01 | 1.6723E−01 |
| S2 | 5.0595E−01 | −4.5232E−01 | 7.9386E−01 | −2.0812E+00 | 4.8699E+00 |
| S3 | −3.1479E−02 | 1.3377E−01 | −1.2255E+00 | 4.4613E+00 | −8.1360E+00 |
| S4 | 3.5308E−02 | 2.7881E−01 | −2.2306E+00 | 1.4586E+01 | −4.0689E+01 |
| S5 | 1.1999E−02 | −6.5388E−01 | 8.7212E+00 | −7.9315E+01 | 4.5343E+02 |
| S6 | −2.3562E−01 | −1.0619E+00 | 1.5193E+01 | −1.0108E+02 | 4.0909E+02 |
| S7 | −5.3178E−01 | −1.0583E+00 | 1.4986E+01 | −7.6343E+01 | 2.3957E+02 |
| S8 | −1.5593E−01 | −1.6055E+00 | 9.9119E+00 | −3.1187E+01 | 6.2622E+01 |
| S9 | 1.8523E−01 | −1.5927E+00 | 5.7147E+00 | −1.2878E+01 | 1.9231E+01 |
| S10 | −1.6917E−01 | 7.0442E−01 | −1.4592E+00 | 2.0969E+00 | −1.8142E+00 |
| S11 | −3.0276E−01 | −7.1933E−02 | 6.1830E−01 | −1.1090E+00 | 1.1111E+00 |
| S12 | −2.7347E−01 | 2.6900E−01 | −2.0117E−01 | 1.0531E−01 | −3.7822E−02 |

| Surface number | A14 | A16 | A18 | A20 |
|---|---|---|---|---|
| S1 | −4.8026E−02 | 5.7815E−03 | 0.0000E+00 | 0.0000E+00 |
| S2 | −5.7621E+00 | 2.3492E+00 | 0.0000E+00 | 0.0000E+00 |
| S3 | 7.4180E+00 | −2.6288E+00 | 0.0000E+00 | 0.0000E+00 |
| S4 | 4.9143E+01 | −4.2352E+00 | 0.0000E+00 | 0.0000E+00 |
| S5 | −1.6727E+03 | 3.8479E+03 | −5.0028E+03 | 2.7931E+03 |
| S6 | −1.0483E+03 | 1.6473E+03 | −1.4426E+03 | 5.3721E+02 |
| S7 | −4.8418E+02 | 6.0977E+02 | −4.3274E+02 | 1.3176E+02 |
| S8 | −8.1216E+01 | 6.5551E+01 | −2.9911E+01 | 5.8969E+00 |
| S9 | −1.8200E+01 | 1.0078E+01 | −2.7793E+00 | 2.3477E−01 |
| S10 | 7.2179E−01 | 1.1682E−01 | −1.9676E−01 | 4.5728E−02 |
| S11 | −6.9417E−01 | 2.6614E−01 | −5.6422E−02 | 5.0108E−03 |
| S12 | 8.9966E−03 | −1.3411E−03 | 1.1234E−04 | −3.9868E−06 |

Table 3 shows the total effective focal length f of the camera lens assembly, and the effective focal length f1 to f6 of respective lens, half of the diagonal length ImgH of an effective pixel area on the image plane S15 and the total track length TTL of the camera lens assembly (i.e., the distance from the object-side surface S1 of the first lens E1 to the image plane S15 on the optical axis) in embodiment 1.

TABLE 3

| | |
|---|---|
| f (mm) | 2.23 |
| f1 (mm) | −3.56 |
| f2 (mm) | 9.36 |
| f3 (mm) | 2.27 |
| f4 (mm) | −4.07 |
| f5 (mm) | 2.22 |
| f6 (mm) | −4.63 |
| ImgH (mm) | 2.89 |
| TTL (mm) | 5.11 |
| HFOV (°) | 58.5 |

The camera lens assembly in embodiment 1 satisfy the followings:

f/CT3=3.97, where f is the total effective focal length of the camera lens assembly, and CT3 is a center thickness of the third lens E3 on the optical axis;

Σ CT×(R3+R4)=10.68, where Σ CT is a sum of center thicknesses of the first lens E1 to the sixth lens E6 on the optical axis, R3 is a radius of curvature of the object-side surface S3 of the second lens E2, and R4 is a radius of curvature of the image-side surface S4 of the second lens E2;

TTL/ImgH=1.77, where TTL is the total track length of the camera lens assembly, and ImgH is half of the diagonal length of the effective pixel area on the image plane S15 of the camera lens assembly;

|f/f34|+|f/f56|=1.37, where f is the total effective focal length of the camera lens assembly, f34 is a combined focal length of the third lens E3 and the fourth lens E4, and f56 is a combined focal length of the fifth lens E5 and the sixth lens E6;

DT12/SAG12=2.14, where DT12 is a maximum effective radius of the image-side surface S2 of the first lens E1, and SAG12 is an axial distance from an intersection of the image-side surface S2 of the first lens E1 and the optical axis to an apex of the effective radius of the image-side surface S2 of the first lens E1;

f/f123=1.44, where f is the total effective focal length of the camera lens assembly, and f123 is a combined focal length of the first lens E1, the second lens E2, and the third lens E3;

|SAG52|/CT5=0.60, where SAG52 is an axial distance from an intersection of the image-side surface S10 of the fifth lens E5 and the optical axis to an apex of the effective radius of the image-side surface S10 of the fifth lens E5, and CT5 is a center thickness of the fifth lens E5 on the optical axis;

CT3/CT6=1.09, where CT3 is the center thickness of the third lens E3 on the optical axis, and CT6 is a center thickness of the sixth lens E6 on the optical axis;

|R5−R8|/R5+R8|=0.03, where R5 is a radius of curvature of the object-side surface S5 of the third lens E3, and R8 is a radius of curvature of the image-side surface S8 of the fourth lens E4;

ImgH/DT52=2.25, where ImgH is half of the diagonal length of the effective pixel area on the image plane S15 of the camera lens assembly, and DT52 is a maximum effective radius of the image-side surface S10 of the fifth lens E5;

T45/f45×10=0.17, where T45 is a spaced distance on the optical axis between the fourth lens E4 and the fifth lens E5, and f45 is a combined focal length of the fourth lens E4 and the fifth lens E5.

Figures 2A, 2B:
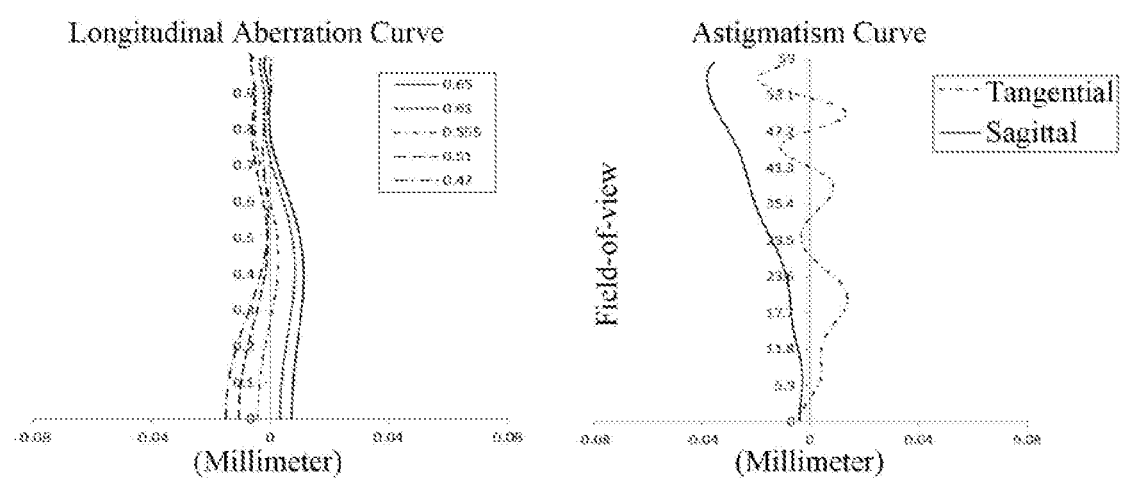
FIGS. 2A to 2D illustrate a longitudinal aberration curve, an astigmatic curve, a distortion curve and a lateral color curve of the camera lens assembly of the embodiment 1, respectively.
Figure 2C:
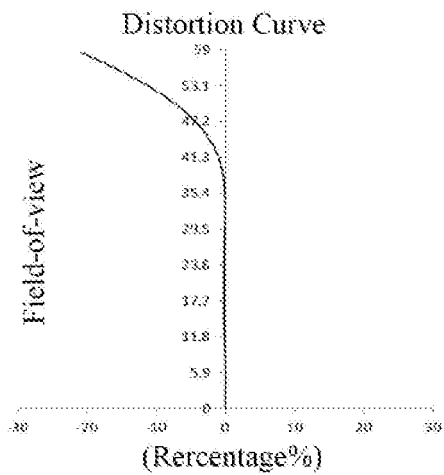
Figure 2D:
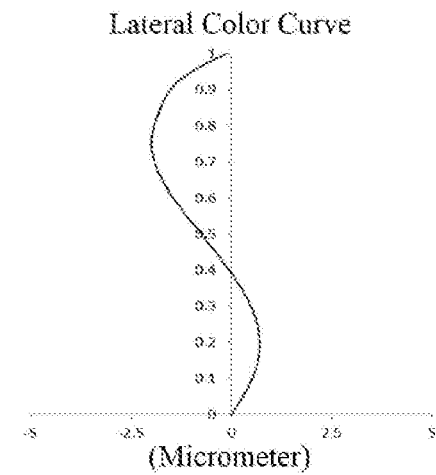

FIG. 2A illustrates a longitudinal aberration curve of the camera lens assembly according to embodiment 1, representing deviations of focal points converged by light of different wavelengths after passing through the camera lens assembly. FIG. 2B illustrates an astigmatism curve of the camera lens assembly according to embodiment 1, representing a curvature of a tangential plane and a curvature of a sagittal plane. FIG. 2C illustrates a distortion curve of the camera lens assembly according to embodiment 1, representing amounts of distortion at different viewing angles. FIG. 2D illustrates a lateral color curve of the camera lens assembly according to embodiment 1, representing deviations of different image heights on an image plane after light passes through the camera lens assembly. It can be seen from FIG. 2A to FIG. 2D that the camera lens assembly provided in embodiment 1 can achieve good image quality.

Embodiment 2

Figure 3:
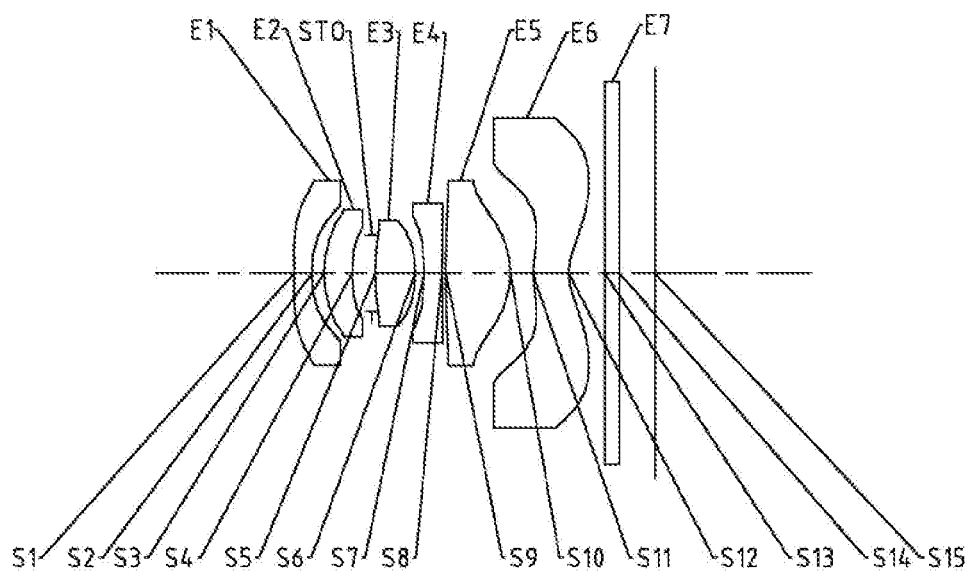
FIG. 3 illustrates a schematic structural view of a camera lens assembly according to embodiment 2 of the present disclosure.

A camera lens assembly according to embodiment 2 of the present disclosure is described below with reference to FIG. 3 to FIG. 4D. In this embodiment and the following embodiments, for the purpose of brevity, the description of parts similar to those in embodiment 1 will be omitted. FIG. 3 is a schematic structural view of the camera lens assembly according to embodiment 2 of the present disclosure.

As shown in FIG. 3, the camera lens assembly according to an exemplary implementation of the present disclosure includes a first lens E1, a second lens E2, a diaphragm STO, a third lens E3, a fourth lens E4, a fifth lens E5, a sixth lens E6, an optical filter E7 and an image plane S15, sequentially from an object side to an image side along an optical axis.

The first lens E1 has a negative refractive power. An object-side surface S1 of the first lens E1 is a concave surface, and an image-side surface S2 of the first lens E1 is a concave surface. The second lens E2 has a positive refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a convex surface. The fourth lens E4 has a negative refractive power. An object-side surface S7 of the fourth lens E4 is a concave surface, and an image-side surface S8 of the fourth lens E4 is a concave surface. The fifth lens E5 has a positive refractive power. An object-side surface S9 of the fifth lens E5 is a convex surface, and an image-side surface S10 of the fifth lens E5 is a convex surface. The sixth lens E6 has a negative refractive power. An object-side surface S11 of the sixth lens E6 is a convex surface, and an image-side surface S12 of the sixth lens E6 is a concave surface. Also, at least one of the object-side surface S11 and the image-side surface S12 of the sixth lens E6 has an inflection point. The optical filter E7 has an object-side surface S13 and an image-side surface S14. Light from an object sequentially passes through the respective surfaces S1 to S14 and is finally imaged on the image plane S15.

Table 4 shows surface type, radius of curvature, thickness, material and conic coefficient of each lens of the camera lens assembly in embodiment 2, wherein the units for the radius of curvature and the thickness are millimeter(mm).

TABLE 4

| Surface number | Surface type | Radius of curvature | Thickness | Material Refractive index | Abbe number | Conic coefficient |
|---|---|---|---|---|---|---|
| OBJ | spherical | infinite | infinite | | | |
| S1 | aspheric | −4.6728 | 0.2500 | 1.54 | 55.7 | −95.0000 |
| S2 | aspheric | 3.1321 | 0.1706 | | | 2.0313 |
| S3 | aspheric | 1.5685 | 0.3946 | 1.67 | 20.4 | 0.6825 |
| S4 | aspheric | 1.9904 | 0.2800 | | | 3.0368 |
| STO | spherical | infinite | 0.0500 | | | |
| S5 | aspheric | 3.4018 | 0.5655 | 1.55 | 56.1 | 2.5105 |
| S6 | aspheric | −1.9335 | 0.1264 | | | 2.7834 |
| S7 | aspheric | −15.3031 | 0.2505 | 1.67 | 20.4 | 5.0000 |
| S8 | aspheric | 3.6899 | 0.0589 | | | −17.1498 |
| S9 | aspheric | 16.0991 | 0.9127 | 1.55 | 56.1 | 5.0000 |
| S10 | aspheric | −1.3041 | 0.3183 | | | −0.1577 |
| S11 | aspheric | 1.3350 | 0.5094 | 1.54 | 55.7 | −11.9173 |

TABLE 4-continued

| Surface number | Surface type | Radius of curvature | Thickness | Material Refractive index | Abbe number | Conic coefficient |
|---|---|---|---|---|---|---|
| S12 | aspheric | 0.7432 | 0.5097 | | | −3.7079 |
| S13 | spherical | infinite | 0.2100 | 1.52 | 64.2 | |
| S14 | spherical | infinite | 0.5005 | | | |
| S15 | spherical | infinite | infinite | | | |

As can be seen from Table 4, in embodiment 2, the object-side surface and the image-side surface of any one of the first lens E1 to the sixth lens E6 are aspheric. Table 5 shows high-order coefficients applicable to each aspheric surface in embodiment 2, wherein the surface shape of each aspheric surface can be defined by the formula (1) given in the above embodiment 1.

TABLE 5

| Surface number | A4 | A6 | A8 | A10 | A12 |
|---|---|---|---|---|---|
| S1 | 4.5495E−01 | −6.7359E−01 | 8.3157E−01 | −6.9949E−01 | 3.7414E−01 |
| S2 | 6.7367E−01 | −8.3677E−01 | 3.5962E−01 | 1.4279E+00 | −2.5059E+00 |
| S3 | −2.2317E−02 | −2.3921E−02 | −8.5989E−01 | 3.9826E+00 | −7.5445E+00 |
| S4 | 3.0055E−02 | 6.5384E−03 | 1.9162E+00 | −1.3322E+01 | 6.1480E+01 |
| S5 | 1.2279E−02 | −7.0502E−01 | 9.8370E+00 | −8.9548E+01 | 5.0790E+02 |
| S6 | −3.0351E−01 | −4.6873E−01 | 8.2975E+00 | −5.2608E+01 | 2.0128E+02 |
| S7 | −5.8523E−01 | −6.1364E−01 | 1.0416E+01 | −5.1082E+01 | 1.5491E+02 |
| S8 | −2.0151E−01 | −1.1919E+00 | 7.5630E+00 | −2.2819E+01 | 4.3964E+01 |
| S9 | 1.3164E−01 | −1.2435E+00 | 4.4878E+00 | −9.7326E+00 | 1.4051E+01 |
| S10 | −2.5850E−01 | 1.0779E+00 | −2.4977E+00 | 4.1637E+00 | −4.6494E+00 |
| S11 | −3.9589E−01 | 1.1840E−01 | 3.6999E−01 | −9.0831E−01 | 1.0345E+00 |
| S12 | −2.6600E−01 | 2.5671E−01 | −1.8675E−01 | 9.3560E−02 | −3.1426E−02 |

| Surface number | A14 | A16 | A18 | A20 |
|---|---|---|---|---|
| S1 | −1.1574E−01 | 1.5373E−02 | 0.0000E+00 | 0.0000E+00 |
| S2 | 1.3321E+00 | −2.0258E−01 | 0.0000E+00 | 0.0000E+00 |
| S3 | 6.8694E+00 | −2.3994E+00 | 0.0000E+00 | 0.0000E+00 |
| S4 | −1.4051E+02 | 1.3544E+02 | 0.0000E+00 | 0.0000E+00 |
| S5 | −1.8290E+03 | 4.0568E+03 | −5.0471E+03 | 2.6889E+03 |
| S6 | −4.9333E+02 | 7.5010E+02 | −6.4023E+02 | 2.3326E+02 |
| S7 | −3.0503E+02 | 3.7719E+02 | −2.6400E+02 | 7.9349E+01 |
| S8 | −5.5444E+01 | 4.4124E+01 | −2.0046E+01 | 3.9559E+00 |
| S9 | −1.3461E+01 | 8.1735E+00 | −2.8362E+00 | 4.2503E−01 |
| S10 | 3.3466E+00 | −1.4373E+00 | 3.2485E−01 | −2.8595E−02 |
| S11 | −7.0631E−01 | 2.9020E−01 | −6.4968E−02 | 6.0281E−03 |
| S12 | 6.7406E−03 | −8.5076E−04 | 5.2977E−05 | −9.3544E−07 |

Table 6 shows the total effective focal length f of the camera lens assembly, and the effective focal length f1 to f6 of respective lens, half of the diagonal length ImgH of an effective pixel area on the image plane S15 and the total track length TTL of the camera lens assembly in embodiment 2.

TABLE 6

| | |
|---|---|
| f (mm) | 2.23 |
| f1 (mm) | −3.46 |
| f2 (mm) | 8.09 |
| f3 (mm) | 2.35 |
| f4 (mm) | −4.44 |
| f5 (mm) | 2.25 |
| f6 (mm) | −4.47 |
| ImgH (mm) | 2.89 |
| TTL (mm) | 5.11 |
| HFOV (°) | 58.5 |

Figure 4A:
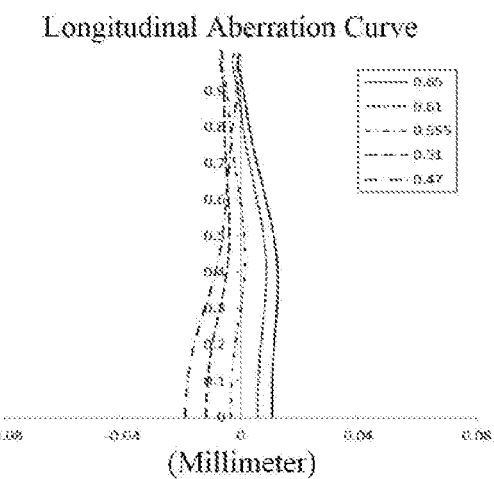
FIGS. 4A to 4D illustrate a longitudinal aberration curve, an astigmatic curve, a distortion curve and a lateral color curve of the camera lens assembly of the embodiment 2, respectively.
Figure 4B:
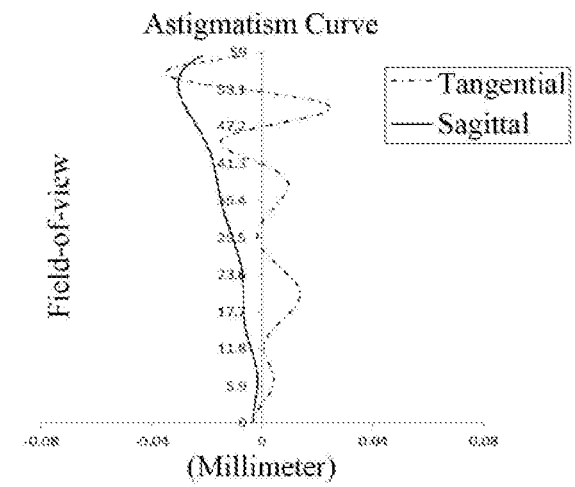
Figure 4C:
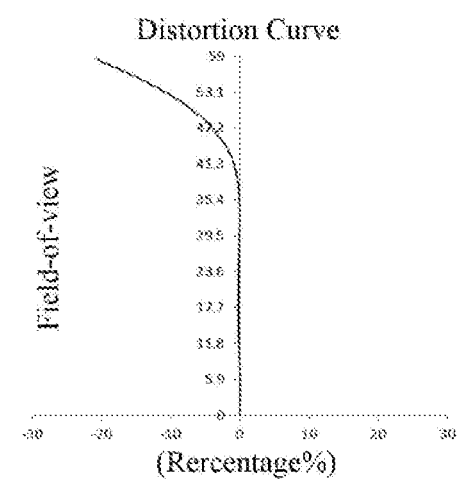
Figure 4D:
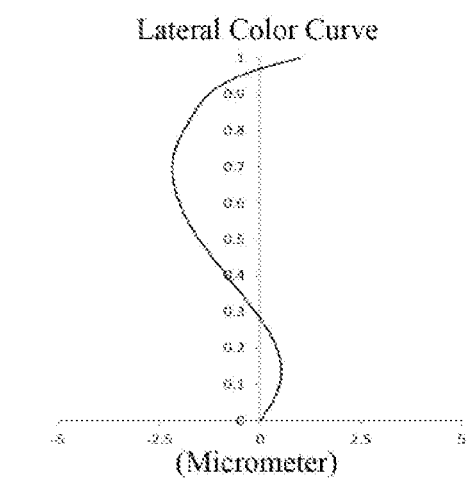

FIG. 4A illustrates a longitudinal aberration curve of the camera lens assembly according to embodiment 2, representing deviations of focal points converged by light of different wavelengths after passing through the camera lens assembly. FIG. 4B illustrates an astigmatism curve of the camera lens assembly according to embodiment 2, representing a curvature of a tangential plane and a curvature of a sagittal plane. FIG. 4C illustrates a distortion curve of the camera lens assembly according to embodiment 2, representing amounts of distortion at different viewing angles. FIG. 4D illustrates a lateral color curve of the camera lens assembly according to embodiment 2, representing deviations of different image heights on an image plane after light passes through the camera lens assembly. It can be seen from FIG. 4A to FIG. 4D that the camera lens assembly provided in embodiment 2 can achieve good image quality.

Embodiment 3

Figure 5:
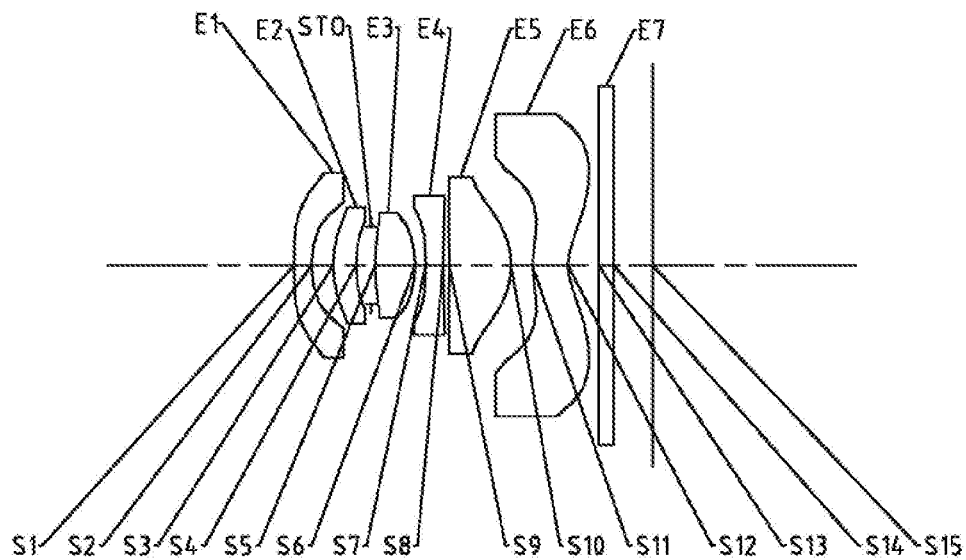
FIG. 5 illustrates a schematic structural view of a camera lens assembly according to embodiment 3 of the present disclosure.

A camera lens assembly according to embodiment 3 of the present disclosure is described below with reference to FIG. 5 to FIG. 6D. FIG. 5 is a schematic structural view of the camera lens assembly according to embodiment 3 of the present disclosure.

As shown in FIG. 5, the camera lens assembly according to an exemplary implementation of the present disclosure includes a first lens E1, a second lens E2, a diaphragm STO, a third lens E3, a fourth lens E4, a fifth lens E5, a sixth lens E6, an optical filter E7 and an image plane S15, sequentially from an object side to an image side along an optical axis.

The first lens E1 has a negative refractive power. An object-side surface S1 of the first lens E1 is a convex surface, and an image-side surface S2 of the first lens E1 is a concave surface. The second lens E2 has a positive refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a convex surface. The fourth lens E4 has a negative refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a concave surface, and an image-side surface S10 of the fifth lens E5 is a convex surface. The sixth lens E6 has a negative refractive power. An object-side surface S11 of the sixth lens E6 is a convex surface, and an image-side surface S12 of the sixth lens E6 is a concave surface. Also, at least one of the object-side surface S11 and the image-side surface S12 of the sixth lens E6 has an inflection point. The optical filter E7 has an object-side surface S13 and an image-side surface S14. Light from an object sequentially passes through the respective surfaces S1 to S14 and is finally imaged on the image plane S15.

Table 7 shows surface type, radius of curvature, thickness, material and conic coefficient of each lens of the camera lens assembly in embodiment 3, wherein the units for the radius of curvature and the thickness are millimeter (mm).

TABLE 7

| Surface number | Surface type | Radius of curvature | Thickness | Material Refractive index | Abbe number | Conic coefficient |
|---|---|---|---|---|---|---|
| OBJ | spherical | infinite | infinite | | | |
| S1 | aspheric | 1000.0000 | 0.2525 | 1.54 | 55.7 | −95.0000 |
| S2 | aspheric | 2.0721 | 0.3029 | | | −45.2791 |
| S3 | aspheric | 1.5663 | 0.3240 | 1.67 | 20.4 | −3.1410 |
| S4 | aspheric | 1.7915 | 0.2220 | | | −3.5894 |
| STO | spherical | infinite | 0.0500 | | | |
| S5 | aspheric | 3.1313 | 0.5718 | 1.55 | 56.1 | −21.9071 |
| S6 | aspheric | −1.7331 | 0.1479 | | | 3.3291 |
| S7 | aspheric | 154.2041 | 0.2500 | 1.67 | 20.4 | −95.0000 |
| S8 | aspheric | 3.3935 | 0.0891 | | | −42.3115 |
| S9 | aspheric | −8.9201 | 0.8758 | 1.55 | 56.1 | −93.9000 |
| S10 | aspheric | −1.2570 | 0.3025 | | | −0.3851 |
| S11 | aspheric | 1.3477 | 0.5061 | 1.54 | 55.7 | −11.6412 |
| S12 | aspheric | | 0.7560 | 0.4395 | | −3.5641 |
| S13 | spherical | infinite | 0.2100 | 1.52 | 64.2 | |
| S14 | spherical | infinite | 0.5544 | | | |
| S15 | spherical | infinite | infinite | | | |

As can be seen from Table 7, in embodiment 3, the object-side surface and the image-side surface of any one of the first lens E1 to the sixth lens E6 are aspheric. Table 8 below shows high-order coefficients applicable to each aspheric surface in embodiment 3, wherein the surface shape of each aspheric surface can be defined by the formula (1) given in the above embodiment 1.

TABLE 8

| Surface number | A4 | A6 | A8 | A10 | A12 |
|---|---|---|---|---|---|
| S1 | 3.7901E−01 | −4.2049E−01 | 4.4542E−01 | −3.2981E−01 | 1.5751E−01 |
| S2 | 1.1216E+00 | −2.6262E+00 | 7.8254E+00 | −1.7468E+01 | 2.6036E+01 |
| S3 | 1.0072E−01 | 4.6248E−02 | −1.2395E+00 | 5.1060E+00 | −1.1441E+01 |
| S4 | 1.2912E−01 | 5.0238E−01 | −6.2238E+00 | 4.0385E+01 | −1.4136E+02 |
| S5 | 1.3298E−01 | −8.3262E−01 | 1.1151E+01 | −1.0658E+02 | 6.1920E+02 |
| S6 | −1.8590E−01 | −2.5461E−01 | 5.6782E+00 | −3.4095E+01 | 1.1734E+02 |
| S7 | −6.0968E−01 | 3.3428E−01 | 1.4800E+00 | −5.9117E+00 | 6.0172E+00 |
| S8 | −1.6719E−01 | −4.7520E−01 | 3.1298E+00 | −7.9460E+00 | 1.1456E+01 |
| S9 | 1.1287E−01 | −5.9687E−01 | 1.6643E+00 | −1.9004E+00 | −6.8523E−01 |

TABLE 8-continued

| | | | | |
|---|---|---|---|---|
| S10 | −2.3476E−01 | 8.7750E−01 | −1.7985E+00 | 2.3849E+00 | −1.7284E+00 |
| S11 | −3.4104E−01 | 1.1131E−03 | 6.6305E−01 | −1.4411E+00 | 1.6493E+00 |
| S12 | −2.6838E−01 | 2.7306E−01 | −2.1069E−01 | 1.1319E−01 | −4.1259E−02 |

| Surface number | A14 | A16 | A18 | A20 |
|---|---|---|---|---|
| S1 | −4.3722E−02 | 4.8931E−03 | 0.0000E+00 | 0.0000E+00 |
| S2 | −2.1925E+01 | 7.5254E+00 | 0.0000E+00 | 0.0000E+00 |
| S3 | 1.2426E+01 | −5.0807E+00 | 0.0000E+00 | 0.0000E+00 |
| S4 | 2.5229E+02 | −1.7244E+02 | 0.0000E+00 | 0.0000E+00 |
| S5 | −2.2254E+03 | 4.8208E+03 | −5.7658E+03 | 2.9180E+03 |
| S6 | −2.5034E+02 | 3.2606E+02 | −2.3519E+02 | 7.1191E+01 |
| S7 | 1.2077E+01 | −4.0617E+01 | 4.4774E+01 | −1.8246E+01 |
| S8 | −9.2860E+00 | 3.4428E+00 | 8.4525E−02 | −3.0740E−01 |
| S9 | 4.8003E+00 | −5.9318E+00 | 3.2886E+00 | −7.1468E−01 |
| S10 | 3.3206E−01 | 4.3312E−01 | −3.0669E−01 | 5.9863E−02 |
| S11 | −1.1394E+00 | 4.6863E−01 | −1.0431E−01 | 9.6095E−03 |
| S12 | 9.8069E−03 | −1.4364E−03 | 1.1592E−04 | −3.8500E−06 |

Table 9 shows the total effective focal length f of the camera lens assembly, and the effective focal length f1 to f6 of respective lens, half of the diagonal length ImgH of an effective pixel area on the image plane S15 and the total track length TTL of the camera lens assembly in embodiment 3.

TABLE 9

| f (mm) | 2.25 |
|---|---|
| f1 (mm) | −3.87 |
| f2 (mm) | 11.87 |
| f3 (mm) | 2.13 |
| f4 (mm) | −5.21 |
| f5 (mm) | 2.58 |
| f6 (mm) | −4.57 |
| ImgH (mm) | 2.88 |
| TTL (mm) | 5.10 |
| HFOV (°) | 58.4 |

Figure 6A:
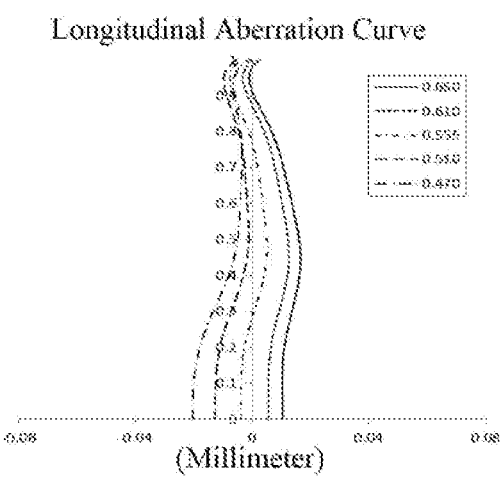
FIGS. 6A to 6D illustrate a longitudinal aberration curve, an astigmatic curve, a distortion curve and a lateral color curve of the camera lens assembly of the embodiment 3, respectively.
Figure 6B:
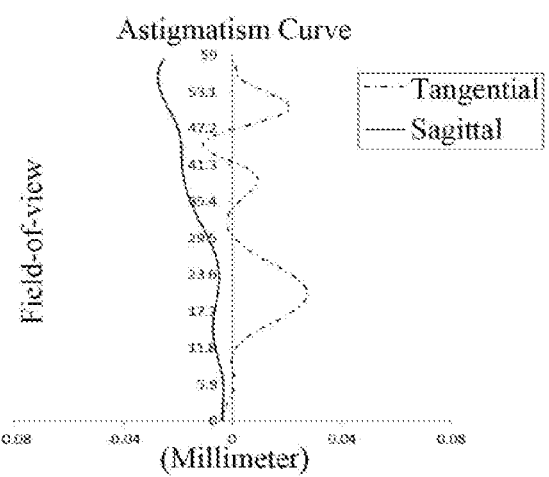
Figure 6C:
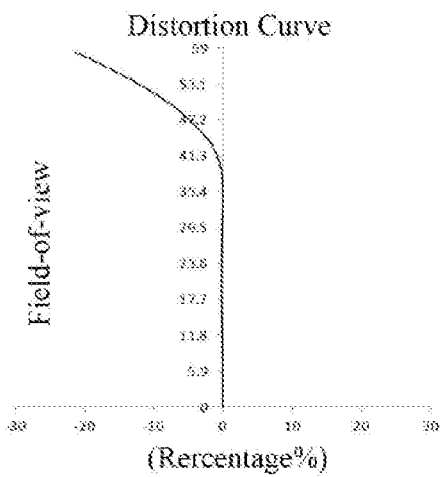
Figure 6D:
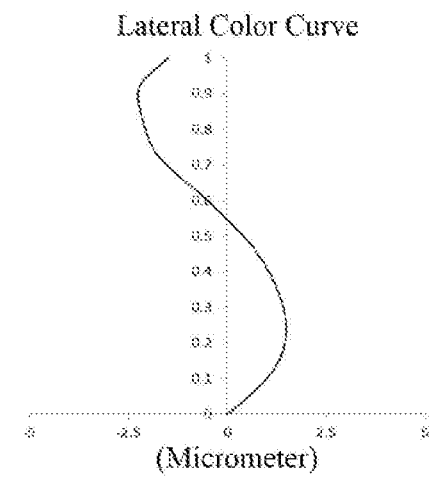

FIG. 6A illustrates a longitudinal aberration curve of the camera lens assembly according to embodiment 3, representing deviations of focal points converged by light of different wavelengths after passing through the camera lens assembly. FIG. 6B illustrates an astigmatism curve of the camera lens assembly according to embodiment 3, representing a curvature of a tangential plane and a curvature of a sagittal plane. FIG. 6C illustrates a distortion curve of the camera lens assembly according to embodiment 3, representing amounts of distortion at different viewing angles. FIG. 6D illustrates a lateral color curve of the camera lens assembly according to embodiment 3, representing deviations of different image heights on an image plane after light passes through the camera lens assembly. It can be seen from FIG. 6A to FIG. 6D that the camera lens assembly provided in embodiment 3 can achieve good image quality.

Embodiment 4

Figure 7:
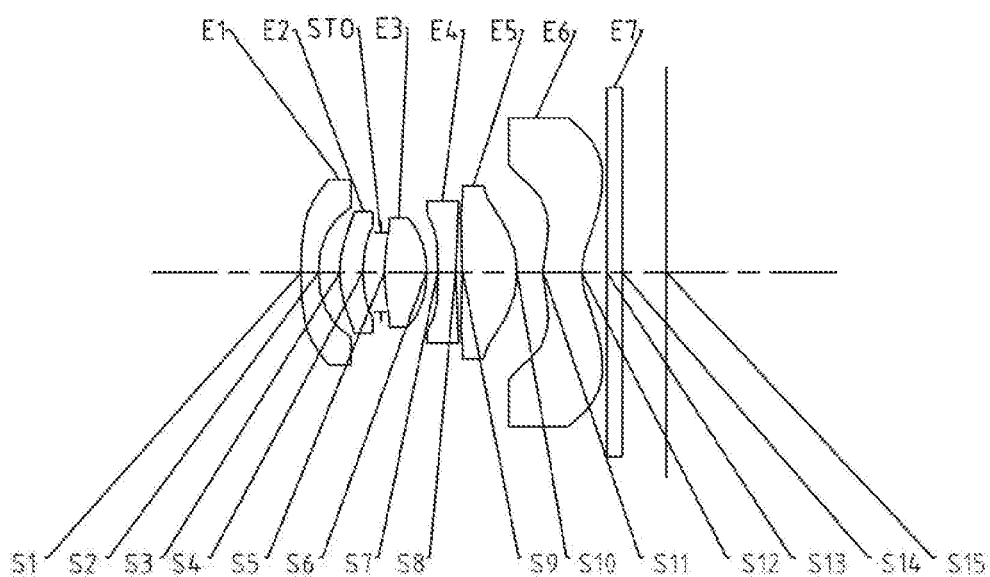
FIG. 7 illustrates a schematic structural view of a camera lens assembly according to embodiment 4 of the present disclosure.

A camera lens assembly according to embodiment 4 of the present disclosure is described below with reference to FIG. 7 to FIG. 8D. FIG. 7 is a schematic structural view of the camera lens assembly according to embodiment 4 of the present disclosure.

As shown in FIG. 7, the camera lens assembly according to an exemplary implementation of the present disclosure includes a first lens E1, a second lens E2, a diaphragm STO, a third lens E3, a fourth lens E4, a fifth lens E5, a sixth lens E6, an optical filter E7 and an image plane S15, sequentially from an object side to an image side along an optical axis.

The first lens E1 has a negative refractive power. An object-side surface S1 of the first lens E1 is a convex surface, and an image-side surface S2 of the first lens E1 is a concave surface. The second lens E2 has a positive refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a convex surface. The fourth lens E4 has a negative refractive power. An object-side surface S7 of the fourth lens E4 is a concave surface, and an image-side surface S8 of the fourth lens E4 is a concave surface. The fifth lens E5 has a positive refractive power. An object-side surface S9 of the fifth lens E5 is a concave surface, and an image-side surface S10 of the fifth lens E5 is a convex surface. The sixth lens E6 has a negative refractive power. An object-side surface S11 of the sixth lens E6 is a convex surface, and an image-side surface S12 of the sixth lens E6 is a concave surface. Also, at least one of the object-side surface S11 and the image-side surface S12 of the sixth lens E6 has an inflection point. The optical filter E7 has an object-side surface S13 and an image-side surface S14. Light from an object sequentially passes through the respective surfaces S1 to S14 and is finally imaged on the image plane S15.

Table 10 shows surface type, radius of curvature, thickness, material and conic coefficient of each lens of the camera lens assembly in embodiment 4, wherein the units for the radius of curvature and the thickness are millimeter (mm).

TABLE 10

| Surface number | Surface type | Radius of curvature | Thickness | Material Refractive index | Material Abbe number | Conic coefficient |
|---|---|---|---|---|---|---|
| OBJ | spherical | infinite | infinite | | | |
| S1 | aspheric | 100.0000 | 0.2500 | 1.54 | 55.7 | −95.0000 |
| S2 | aspheric | 1.8238 | 0.2943 | | | −0.6944 |
| S3 | aspheric | 1.5057 | 0.3236 | 1.67 | 20.4 | −0.0424 |
| S4 | aspheric | 1.7518 | 0.2582 | | | 0.8435 |
| STO | spherical | infinite | 0.0500 | | | |
| S5 | aspheric | 3.1013 | 0.5940 | 1.55 | 56.1 | 4.6169 |

TABLE 10-continued

| Surface number | Surface type | Radius of curvature | Thickness | Material Refractive index | Abbe number | Conic coefficient |
|---|---|---|---|---|---|---|
| S6 | aspheric | −1.6044 | 0.1606 | | | 1.4449 |
| S7 | aspheric | −9476.9290 | 0.2500 | 1.67 | 20.4 | 5.0000 |
| S8 | aspheric | 3.2892 | 0.0943 | | | −11.1773 |
| S9 | aspheric | −8.0280 | 0.7699 | 1.55 | 56.1 | 5.0000 |
| S10 | aspheric | −1.4860 | 0.3702 | | | −0.0144 |
| S11 | aspheric | 1.2296 | 0.5422 | 1.54 | 55.7 | −8.7360 |
| S12 | aspheric | 0.7974 | 0.3588 | | | −2.9484 |
| S13 | spherical | infinite | 0.2100 | 1.52 | 64.2 | |
| S14 | spherical | infinite | 0.6271 | | | |
| S15 | spherical | infinite | infinite | | | |

As can be seen from Table 10, in embodiment 4, the object-side surface and the image-side surface of any one of the first lens E1 to the sixth lens E6 are aspheric. Table 11 below shows high-order coefficients applicable to each aspheric surface in embodiment 4, wherein the surface shape of each aspheric surface can be defined by the formula (1) given in the above embodiment 1.

TABLE 11

| Surface number | A4 | A6 | A8 | A10 | A12 |
|---|---|---|---|---|---|
| S1 | 3.1090E−01 | −2.9945E−01 | 2.5659E−01 | −1.2164E−01 | 1.2894E−02 |
| S2 | 3.9926E−01 | −1.8492E−01 | 9.0640E−02 | 7.0243E−04 | 7.0230E−01 |
| S3 | −5.9317E−02 | 1.8295E−01 | −1.5514E+00 | 5.4179E+00 | −1.0772E+01 |
| S4 | 3.3884E−02 | 2.6225E−01 | −2.6769E+00 | 1.5577E+01 | −4.7227E+01 |
| S5 | 3.4374E−02 | −7.7913E−01 | 1.1264E+01 | −1.0241E+02 | 5.6313E+02 |
| S6 | −1.5107E−01 | −1.7665E−01 | 3.2241E+00 | −1.9332E+01 | 7.1475E+01 |
| S7 | −4.8375E−01 | −2.2995E−01 | 4.2143E+00 | −2.0637E+01 | 6.5882E+01 |
| S8 | −1.9779E−01 | −3.0727E−01 | 2.4634E+00 | −8.0697E+00 | 1.7165E+01 |
| S9 | 1.1327E−01 | −2.6411E−01 | 8.1749E−01 | −2.4625E+00 | 5.4353E+00 |
| S10 | −3.1576E−01 | 1.0054E+00 | −2.1589E+00 | 3.4410E+00 | −3.5915E+00 |
| S11 | −2.9933E−01 | −2.0646E−01 | 1.0758E+00 | −1.9552E+00 | 2.0785E+00 |
| S12 | −3.3747E−01 | 3.6267E−01 | −2.8681E−01 | 1.5711E−01 | −5.8553E−02 |

| Surface number | A14 | A16 | A18 | A20 |
|---|---|---|---|---|
| S1 | 1.3382E−02 | −4.6443E−03 | 0.0000E+00 | 0.0000E+00 |
| S2 | −1.0676E+00 | 2.7317E−01 | 0.0000E+00 | 0.0000E+00 |
| S3 | 1.0787E+01 | −4.1913E+00 | 0.0000E+00 | 0.0000E+00 |
| S4 | 7.0880E+00 | −3.5253E+01 | 0.0000E+00 | 0.0000E+00 |
| S5 | −1.9121E+03 | 3.9131E+03 | −4.4203E+03 | 2.1136E+03 |
| S6 | −1.7177E+02 | 2.5541E+02 | −2.1000E+02 | 7.1991E+01 |
| S7 | −1.3780E+02 | 1.7856E+02 | −1.2814E+02 | 3.8707E+01 |
| S8 | −2.3489E+01 | 1.9737E+01 | −9.2521E+00 | 1.8595E+00 |
| S9 | −7.2284E+00 | 5.5258E+00 | −2.2524E+00 | 3.7822E−01 |
| S10 | 2.2106E+00 | −5.9839E−01 | −3.0851E−02 | 3.3776E−02 |
| S11 | −1.3849E+00 | 5.6153E−01 | −1.2495E−01 | 1.1609E−02 |
| S12 | 1.4364E−02 | −2.2020E−03 | 1.8979E−04 | −6.9573E−06 |

Table 12 shows the total effective focal length f of the camera lens assembly, and the effective focal length f1 to f6 of respective lens, half of the diagonal length ImgH of an effective pixel area on the image plane S15 and the total track length TTL of the camera lens assembly in embodiment 4.

TABLE 12

| f (mm) | 2.26 |
|---|---|
| f1 (mm) | −3.46 |
| f2 (mm) | 10.55 |
| f3 (mm) | 2.03 |
| f4 (mm) | −4.94 |
| f5 (mm) | 3.21 |

TABLE 12-continued

| f6 (mm) | −7.52 |
|---|---|
| ImgH (mm) | 2.89 |
| TTL (mm) | 5.15 |
| HFOV (°) | 58.5 |

Figure 8A:
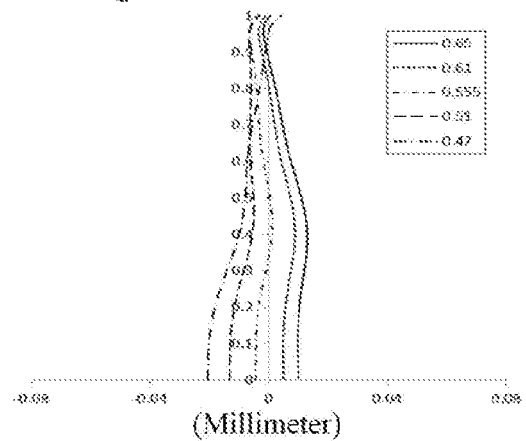
FIGS. 8A to 8D illustrate a longitudinal aberration curve, an astigmatic curve, a distortion curve and a lateral color curve of the camera lens assembly of the embodiment 4, respectively.
Figure 8B:
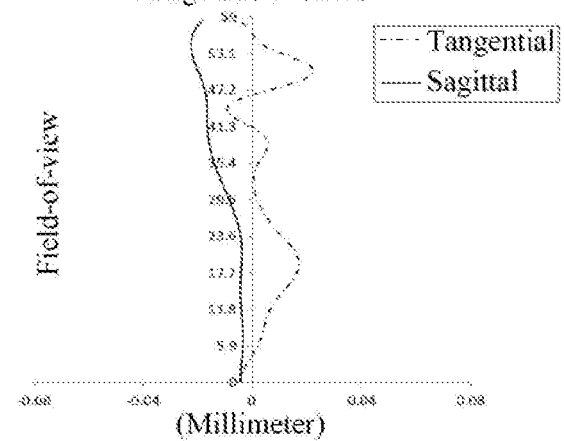
Figure 8C:
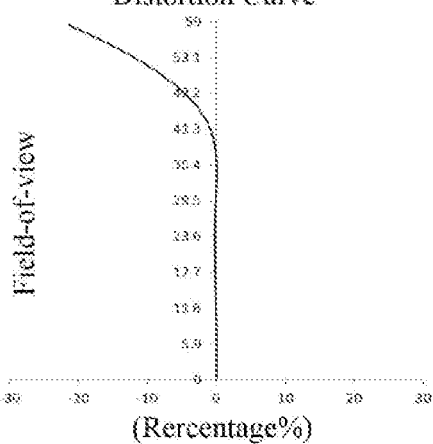
Figure 8D:
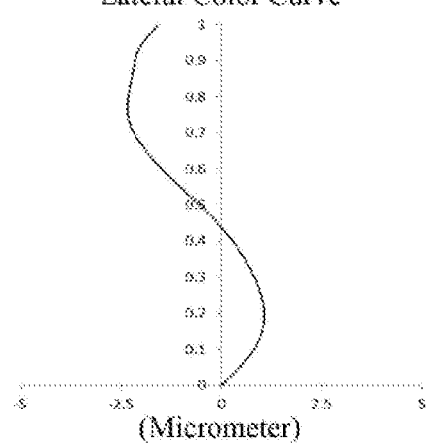

FIG. 8A illustrates a longitudinal aberration curve of the camera lens assembly according to embodiment 4, representing deviations of focal points converged by light of different wavelengths after passing through the camera lens assembly. FIG. 8B illustrates an astigmatism curve of the camera lens assembly according to embodiment 4, representing a curvature of a tangential plane and a curvature of a sagittal plane. FIG. 8C illustrates a distortion curve of the camera lens assembly according to embodiment 4, representing amounts of distortion at different viewing angles. FIG. 8D illustrates a lateral color curve of the camera lens assembly according to embodiment 4, representing deviations of different image heights on an image plane after light passes through the camera lens assembly. It can be seen from FIG. 8A to FIG. 8D that the camera lens assembly provided in embodiment 4 can achieve good image quality.

Embodiment 5

Figure 9:
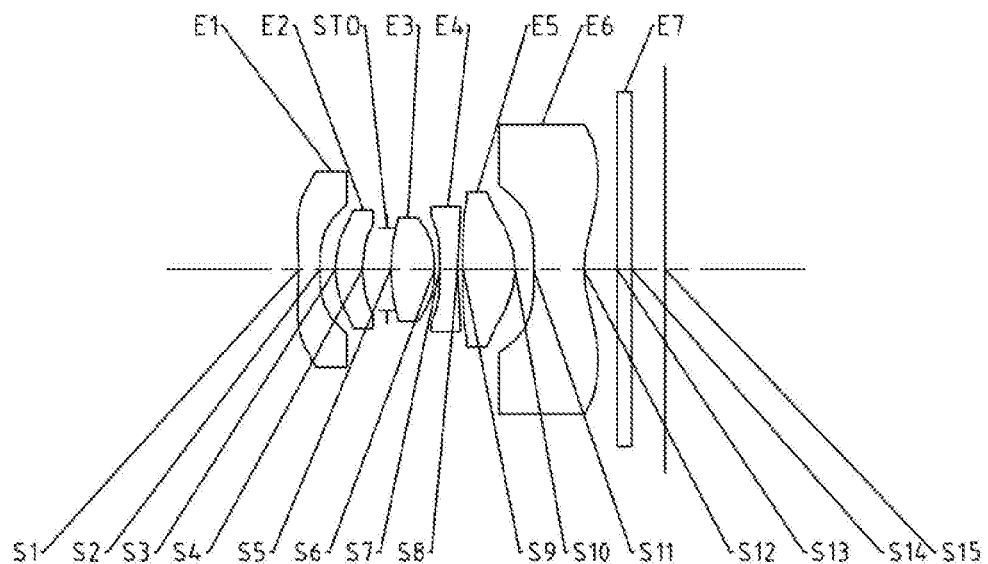
FIG. 9 illustrates a schematic structural view of a camera lens assembly according to embodiment 5 of the present disclosure.

A camera lens assembly according to embodiment 5 of the present disclosure is described below with reference to FIG. 9 to FIG. 10D. FIG. 9 is a schematic structural view of the camera lens assembly according to embodiment 5 of the present disclosure.

As shown in FIG. 9, the camera lens assembly according to an exemplary implementation of the present disclosure includes a first lens E1, a second lens E2, a diaphragm STO, a third lens E3, a fourth lens E4, a fifth lens E5, a sixth lens E6, an optical filter E7 and an image plane S15, sequentially from an object side to an image side along an optical axis.

The first lens E1 has a negative refractive power. An object-side surface S1 of the first lens E1 is a concave surface, and an image-side surface S2 of the first lens E1 is a concave surface. The second lens E2 has a positive refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a convex surface. The fourth lens E4 has a negative refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a convex surface, and an image-side surface S10 of the fifth lens E5 is a convex surface. The sixth lens E6 has a negative refractive power. An object-side surface S11 of the sixth lens E6 is a concave surface, and an image-side surface S12 of the sixth lens E6 is a concave surface. Also, at least one of the object-side surface S11 and the image-side surface S12 of the sixth lens E6 has an inflection point. The optical filter E7 has an object-side surface S13 and an image-side surface S14. Light from an object sequentially passes through the respective surfaces S1 to S14 and is finally imaged on the image plane S15.

Table 13 shows surface type, radius of curvature, thickness, material and conic coefficient of each lens of the camera lens assembly in embodiment 5, wherein the units for the radius of curvature and the thickness are millimeter (mm).

TABLE 13

| Surface number | Surface type | Radius of curvature | Thickness | Material Refractive index | Abbe number | Conic coefficient |
|---|---|---|---|---|---|---|
| OBJ | spherical | infinite | infinite | | | |
| S1 | aspheric | −1.7788 | 0.2883 | 1.54 | 55.7 | −29.9609 |
| S2 | aspheric | 13.5492 | 0.2164 | | | 0.4873 |
| S3 | aspheric | 1.3405 | 0.3777 | 1.67 | 20.4 | 0.4662 |
| S4 | aspheric | 1.6451 | 0.3448 | | | 1.4014 |
| STO | spherical | infinite | 0.0522 | | | |
| S5 | aspheric | 2.3612 | 0.6147 | 1.55 | 56.1 | 2.6412 |
| S6 | aspheric | −1.8113 | 0.0731 | | | 2.5505 |
| S7 | aspheric | 15.7285 | 0.2500 | 1.67 | 20.4 | −95.0000 |
| S8 | aspheric | 2.8477 | 0.0725 | | | −9.9917 |
| S9 | aspheric | 113.5385 | 0.7268 | 1.55 | 56.1 | 5.0000 |
| S10 | aspheric | −1.1424 | 0.2599 | | | −0.2611 |
| S11 | aspheric | −1000.0000 | 0.7021 | 1.54 | 55.7 | 5.0000 |
| S12 | aspheric | 1.3098 | 0.4654 | | | −5.4119 |
| S13 | spherical | infinite | 0.2100 | 1.52 | 64.2 | |
| S14 | spherical | infinite | 0.4560 | | | |
| S15 | spherical | infinite | infinite | | | |

As can be seen from Table 13, in embodiment 5, the object-side surface and the image-side surface of any one of the first lens E1 to the sixth lens E6 are aspheric. Table 14 below shows high-order coefficients applicable to each aspheric surface in embodiment 5, wherein the surface shape of each aspheric surface can be defined by the formula (1) given in the above embodiment 1.

TABLE 14

| Surface number | A4 | A6 | A8 | A10 | A12 |
|---|---|---|---|---|---|
| S1 | 4.0484E−01 | −5.0661E−01 | 5.0100E−01 | −3.3507E−01 | 1.4061E−01 |
| S2 | 1.1397E+00 | −2.2065E+00 | 4.5496E+00 | −7.2331E+00 | 8.2146E+00 |
| S3 | 4.3133E−02 | −4.1081E−01 | 2.7253E−01 | 1.1655E+00 | −4.4815E+00 |
| S4 | 2.8885E−02 | −4.0437E−01 | 3.6569E+00 | −1.7520E+01 | 5.1194E+01 |
| S5 | −1.4734E−02 | 4.5241E−01 | −8.4014E+00 | 7.2926E+01 | −3.7371E+02 |
| S6 | −5.5314E−01 | 2.1859E+00 | −7.3970E+00 | 2.1816E+01 | −6.4319E+01 |
| S7 | −9.6352E−01 | 2.4262E+00 | −3.9829E+00 | −5.8683E+00 | 5.0931E+01 |
| S8 | −4.0979E−01 | 3.2319E−01 | 2.9861E+00 | −1.5201E+01 | 3.7055E+01 |
| S9 | 4.3569E−02 | −4.2102E−01 | 2.6126E+00 | −7.7172E+00 | 1.3927E+01 |
| S10 | 1.3227E−01 | −9.8956E−02 | 3.1512E−01 | −3.3980E−01 | −1.0116E−01 |
| S11 | −2.7944E−01 | −7.0590E−02 | 6.2753E−01 | −1.5486E+00 | 2.0953E+00 |
| S12 | −1.6569E−01 | 1.4940E−01 | −1.1397E−01 | 6.3169E−02 | −2.4161E−02 |

| Surface number | A14 | A16 | A18 | A20 |
|---|---|---|---|---|
| S1 | −3.3085E−02 | 3.2328E−03 | 0.0000E+00 | 0.0000E+00 |
| S2 | −5.7434E+00 | 1.6851E+00 | 0.0000E+00 | 0.0000E+00 |
| S3 | 5.6085E+00 | −2.4067E+00 | 0.0000E+00 | 0.0000E+00 |
| S4 | −8.3621E+01 | 6.4804E+01 | 0.0000E+00 | 0.0000E+00 |
| S5 | 1.1491E+03 | −2.0898E+03 | 2.0728E+03 | −8.6323E+02 |
| S6 | 1.5683E+02 | −2.4905E+02 | 2.1834E+02 | −7.9254E+01 |
| S7 | −1.3486E+02 | 1.9515E+02 | −1.5080E+02 | 4.8225E+01 |
| S8 | −5.3481E+01 | 4.6420E+01 | −2.2329E+01 | 4.5647E+00 |
| S9 | −1.5937E+01 | 1.1255E+01 | −4.4731E+00 | 7.6423E−01 |
| S10 | 8.3152E−01 | −9.1573E−01 | 4.1375E−01 | −6.8736E−02 |
| S11 | −1.7190E+00 | 8.3247E−01 | −2.1391E−01 | 2.2252E−02 |
| S12 | 6.1351E−03 | −9.8242E−04 | 8.9372E−05 | −3.5026E−06 |

Table 15 shows the total effective focal length f of the camera lens assembly, and the effective focal length f1 to f6 of respective lens, half of the diagonal length ImgH of an effective pixel area on the image plane S15 and the total track length TTL of the camera lens assembly in embodiment 5.

TABLE 15

| | |
|---|---|
| f (mm) | 2.20 |
| f1 (mm) | −2.91 |
| f2 (mm) | 7.57 |
| f3 (mm) | 1.98 |
| f4 (mm) | −5.26 |
| f5 (mm) | 2.08 |
| f6 (mm) | −2.44 |
| ImgH (mm) | 2.89 |
| TTL (mm) | 5.11 |
| HFOV (°) | 58.5 |

Figures 10A, 10B:
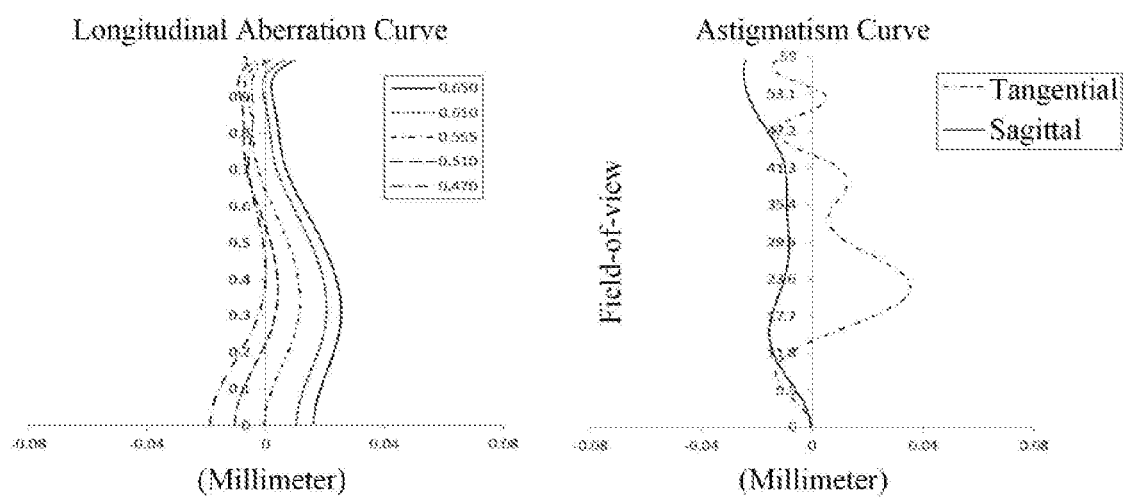
FIGS. 10A to 10D illustrate a longitudinal aberration curve, an astigmatic curve, a distortion curve and a lateral color curve of the camera lens assembly of the embodiment 5, respectively.
Figure 10C:
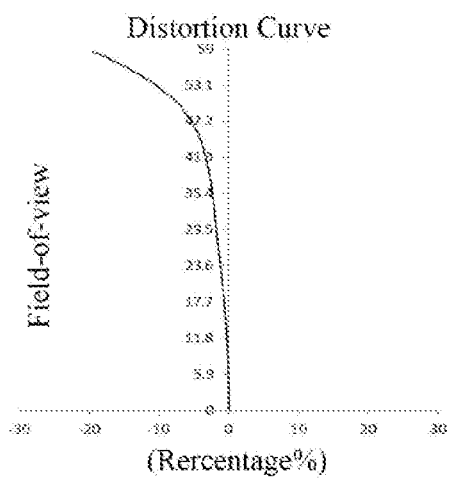
Figure 10D:
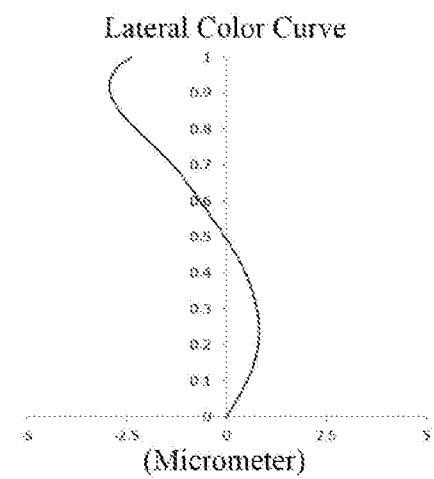

FIG. 10A illustrates a longitudinal aberration curve of the camera lens assembly according to embodiment 5, representing deviations of focal points converged by light of different wavelengths after passing through the camera lens assembly. FIG. 10B illustrates an astigmatism curve of the camera lens assembly according to embodiment 5, representing a curvature of a tangential plane and a curvature of a sagittal plane. FIG. 10C illustrates a distortion curve of the camera lens assembly according to embodiment 5, representing amounts of distortion at different viewing angles. FIG. 10D illustrates a lateral color curve of the camera lens assembly according to embodiment 5, representing deviations of different image heights on an image plane after light passes through the camera lens assembly. It can be seen from FIG. 10A to FIG. 10D that the camera lens assembly provided in embodiment 5 can achieve good image quality.

Embodiment 6

Figure 11:
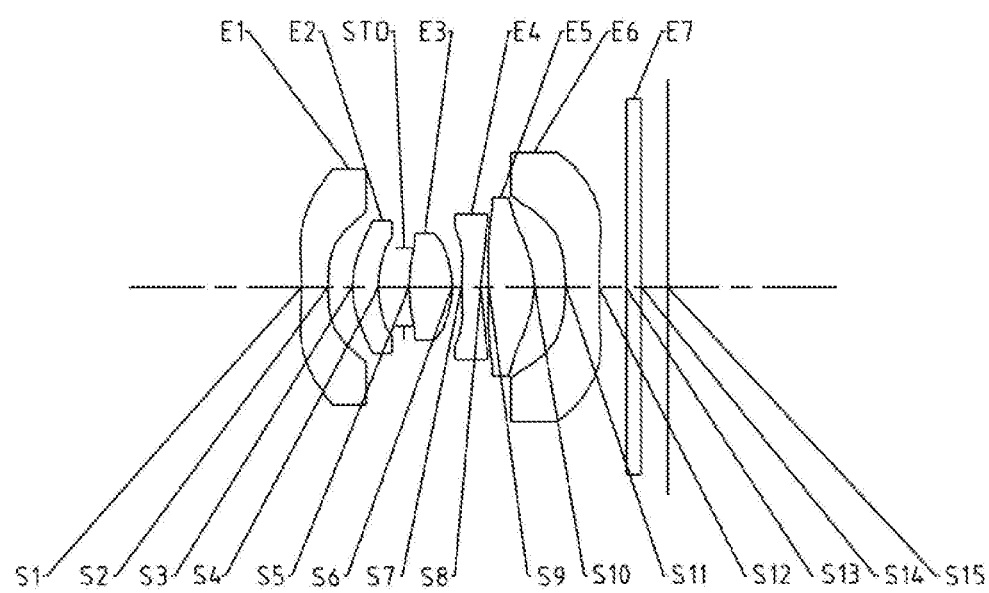
FIG. 11 illustrates a schematic structural view of a camera lens assembly according to embodiment 6 of the present disclosure.

A camera lens assembly according to embodiment 6 of the present disclosure is described below with reference to FIG. 11 to FIG. 12D. FIG. 11 is a schematic structural view of the camera lens assembly according to embodiment 6 of the present disclosure.

As shown in FIG. 11, the camera lens assembly according to an exemplary implementation of the present disclosure includes a first lens E1, a second lens E2, a diaphragm STO, a third lens E3, a fourth lens E4, a fifth lens E5, a sixth lens E6, an optical filter E7 and an image plane S15, sequentially from an object side to an image side along an optical axis.

The first lens E1 has a negative refractive power. An object-side surface S1 of the first lens E1 is a concave surface, and an image-side surface S2 of the first lens E1 is a concave surface. The second lens E2 has a positive refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a convex surface. The fourth lens E4 has a negative refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a concave surface, and an image-side surface S10 of the fifth lens E5 is a convex surface. The sixth lens E6 has a negative refractive power. An object-side surface S11 of the sixth lens E6 is a concave surface, and an image-side surface S12 of the sixth lens E6 is a convex surface. Also, at least one of the object-side surface S11 and the image-side surface S12 of the sixth lens E6 has an inflection point. The optical filter E7 has an object-side surface S13 and an image-side surface S14. Light from an object sequentially passes through the respective surfaces S1 to S14 and is finally imaged on the image plane S15.

Table 16 shows surface type, radius of curvature, thickness, material and conic coefficient of each lens of the camera lens assembly in embodiment 6, wherein the units for the radius of curvature and the thickness are millimeter (mm).

TABLE 16

| Surface number | Surface type | Radius of curvature | Thickness | Material | | Conic coefficient |
| | | | | Refractive index | Abbe number | |
|---|---|---|---|---|---|---|
| OBJ | spherical | infinite | infinite | | | |
| S1 | aspheric | −1.9917 | 0.3620 | 1.54 | 55.7 | −41.3789 |
| S2 | aspheric | 7.3363 | 0.3416 | | | −0.2873 |
| S3 | aspheric | 1.3500 | 0.3662 | 1.67 | 20.4 | 0.3697 |
| S4 | aspheric | 1.6510 | 0.3593 | | | 1.7883 |
| STO | spherical | infinite | 0.0703 | | | |
| S5 | aspheric | 2.5190 | 0.6012 | 1.55 | 56.1 | 2.9788 |
| S6 | aspheric | −1.7509 | 0.1326 | | | 2.3049 |
| S7 | aspheric | 2.6204 | 0.2646 | 1.67 | 20.4 | −58.1699 |
| S8 | aspheric | 1.5915 | 0.1159 | | | −11.5402 |
| S9 | aspheric | −80.0938 | 0.6375 | 1.55 | 56.1 | −95.0000 |
| S10 | aspheric | −1.2091 | 0.4404 | | | −0.2716 |
| S11 | aspheric | −1.8193 | 0.4599 | 1.54 | 55.7 | −6.1440 |
| S12 | aspheric | −18.2313 | 0.3794 | | | −55.2450 |
| S13 | spherical | infinite | 0.2100 | 1.52 | 64.2 | |
| S14 | spherical | infinite | 0.3690 | | | |
| S15 | spherical | infinite | infinite | | | |

As can be seen from Table 16, in embodiment 6, the object-side surface and the image-side surface of any one of the first lens E1 to the sixth lens E6 are aspheric. Table 17 below shows high-order coefficients applicable to each aspheric surface in embodiment 6, wherein the surface shape of each aspheric surface can be defined by the formula (1) given in the above embodiment 1.

TABLE 17

| Surface number | A4 | A6 | A8 | A10 | A12 |
|---|---|---|---|---|---|
| S1 | 3.3799E−01 | −3.6141E−01 | 3.0560E−01 | −1.7232E−01 | 6.0862E−02 |
| S2 | 1.0421E+00 | −1.9618E+00 | 3.8184E+00 | −5.4752E+00 | 5.5237E+00 |
| S3 | 8.3677E−02 | −7.5235E−01 | 2.1402E+00 | −4.6002E+00 | 5.4277E+00 |
| S4 | 8.9848E−02 | −9.8890E−01 | 8.2564E+00 | −4.0576E+01 | 1.1753E+02 |
| S5 | 5.8342E−02 | −2.2537E+00 | 3.5898E+01 | −3.3691E+02 | 1.9208E+03 |
| S6 | −5.5171E−01 | 1.6765E+00 | −1.9118E+00 | −1.5311E+01 | 1.0743E+02 |
| S7 | −7.4364E−01 | 1.4624E+00 | −4.7422E+00 | 1.9290E+01 | −6.3731E+01 |
| S8 | −3.8786E−01 | 5.6434E−01 | 2.5586E−01 | −3.0726E+00 | 6.5923E+00 |

TABLE 17-continued

| | | | | | |
|---|---|---|---|---|---|
| S9 | 4.2232E−02 | −6.0130E−01 | 3.6060E+00 | −1.0068E+01 | 1.6221E+01 |
| S10 | 2.6054E−01 | −2.1637E−01 | −6.4789E−01 | 3.4420E+00 | −6.3292E+00 |
| S11 | 3.9041E−01 | −1.3549E+00 | 9.0869E−01 | 1.0772E+00 | −3.2154E+00 |
| S12 | 5.2418E−01 | −1.2520E+00 | 1.4857E+00 | −1.1475E+00 | 5.9345E−01 |

| Surface number | A14 | A16 | A18 | A20 |
|---|---|---|---|---|
| S1 | −1.2104E−02 | 1.0142E−03 | 0.0000E+00 | 0.0000E+00 |
| S2 | −3.4313E+00 | 9.0334E−01 | 0.0000E+00 | 0.0000E+00 |
| S3 | −3.1843E+00 | 6.9541E−01 | 0.0000E+00 | 0.0000E+00 |
| S4 | −1.7889E+02 | 1.1539E+02 | 0.0000E+00 | 0.0000E+00 |
| S5 | −6.7553E+03 | 1.4299E+04 | −1.6692E+04 | 8.2562E+03 |
| S6 | −3.3812E+02 | 5.9762E+02 | −5.7420E+02 | 2.3599E+02 |
| S7 | 1.4260E+02 | −1.9891E+02 | 1.5414E+02 | −4.9939E+01 |
| S8 | −6.9058E+00 | 3.4739E+00 | −5.0407E−01 | −1.0689E−01 |
| S9 | −1.5814E+01 | 9.1634E+00 | −2.8867E+00 | 3.7643E−01 |
| S10 | 6.3016E+00 | −3.5729E+00 | 1.0806E+00 | −1.3512E−01 |
| S11 | 3.5931E+00 | −2.1735E+00 | 6.9161E−01 | −8.9685E−02 |
| S12 | −2.0271E−01 | 4.3831E−02 | −5.4413E−03 | 2.9585E−04 |

Table 18 shows the total effective focal length f of the camera lens assembly, and the effective focal length f1 to f6 of respective lens, half of the diagonal length ImgH of an effective pixel area on the image plane S15 and the total track length TTL of the camera lens assembly in embodiment 6.

TABLE 18

| | |
|---|---|
| f (mm) | 1.96 |
| f1 (mm) | −2.88 |
| f2 (mm) | 7.79 |
| f3 (mm) | 1.99 |
| f4 (mm) | −6.79 |
| f5 (mm) | 2.24 |
| f6 (mm) | −3.80 |
| ImgH (mm) | 2.89 |
| TTL (mm) | 5.11 |
| HFOV (°) | 58.6 |

Figure 12A:
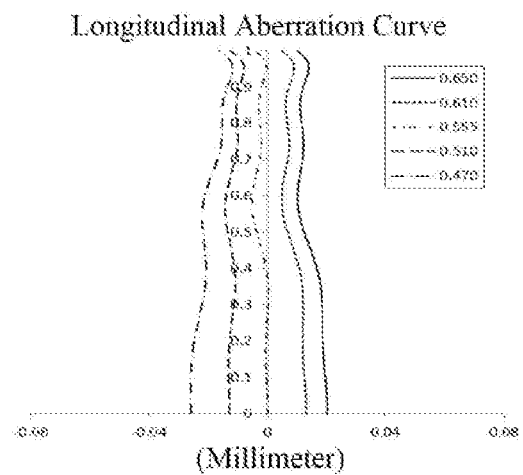
FIGS. 12A to 12D illustrate a longitudinal aberration curve, an astigmatic curve, a distortion curve and a lateral color curve of the camera lens assembly of the embodiment 6, respectively.
Figure 12B:
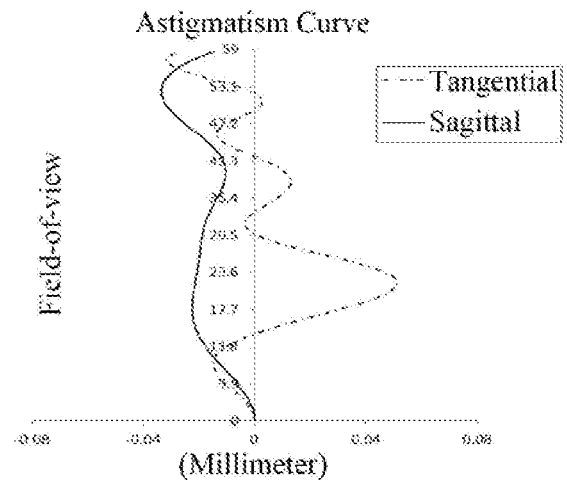
Figure 12C:
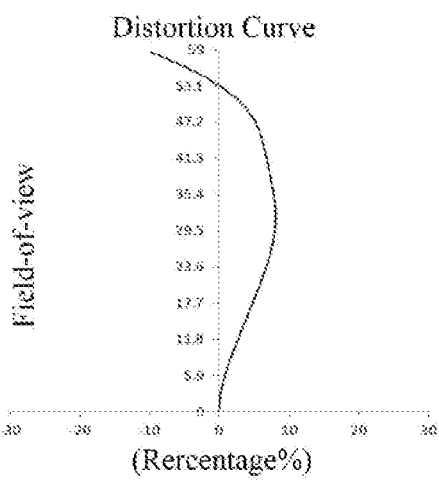
Figure 12D:
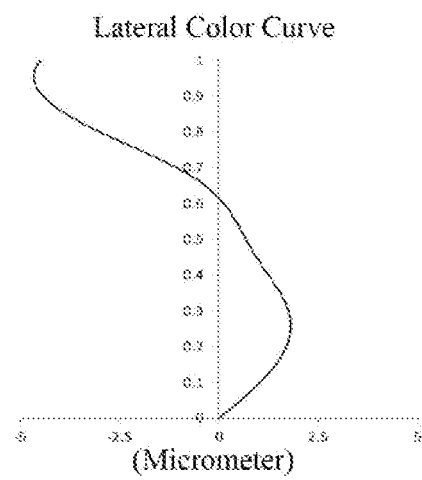

FIG. 12A illustrates a longitudinal aberration curve of the camera lens assembly according to embodiment 6, representing deviations of focal points converged by light of different wavelengths after passing through the camera lens assembly. FIG. 12B illustrates an astigmatism curve of the camera lens assembly according to embodiment 6, representing a curvature of a tangential plane and a curvature of a sagittal plane. FIG. 12C illustrates a distortion curve of the camera lens assembly according to embodiment 6, representing amounts of distortion at different viewing angles. FIG. 12D illustrates a lateral color curve of the camera lens assembly according to embodiment 6, representing deviations of different image heights on an image plane after light passes through the camera lens assembly. It can be seen from FIG. 12A to FIG. 12D that the camera lens assembly provided in embodiment 6 can achieve good image quality.

Embodiment 7

A camera lens assembly according to embodiment 7 of the present disclosure is described below with reference to FIG. 13 to FIG. 14D. FIG. 13 is a schematic structural view of the camera lens assembly according to embodiment 7 of the present disclosure.

As shown in FIG. 13, the camera lens assembly according to an exemplary implementation of the present disclosure includes a first lens E1, a second lens E2, a diaphragm STO, a third lens E3, a fourth lens E4, a fifth lens E5, a sixth lens E6, an optical filter E7 and an image plane S15, sequentially from an object side to an image side along an optical axis.

The first lens E1 has a negative refractive power. An object-side surface S1 of the first lens E1 is a concave surface, and an image-side surface S2 of the first lens E1 is a convex surface. The second lens E2 has a positive refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a convex surface. The fourth lens E4 has a negative refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a convex surface, and an image-side surface S10 of the fifth lens E5 is a convex surface. The sixth lens E6 has a negative refractive power. An object-side surface S11 of the sixth lens E6 is a concave surface, and an image-side surface S12 of the sixth lens E6 is a concave surface. Also, at least one of the object-side surface S11 and the image-side surface S12 of the sixth lens E6 has an inflection point. The optical filter E7 has an object-side surface S13 and an image-side surface S14. Light from an object sequentially passes through the respective surfaces S1 to S14 and is finally imaged on the image plane S15.

Table 19 shows surface type, radius of curvature, thickness, material and conic coefficient of each lens of the camera lens assembly in embodiment 7, wherein the units for the radius of curvature and the thickness are millimeter (mm).

TABLE 19

| Surface number | Surface type | Radius of curvature | Thickness | Material Refractive index | Material Abbe number | Conic coefficient |
|---|---|---|---|---|---|---|
| OBJ | spherical | infinite | infinite | | | |
| S1 | aspheric | −1.6826 | 0.4426 | 1.54 | 55.7 | −20.9724 |
| S2 | aspheric | −311.6410 | 0.3963 | | | 5.0000 |
| S3 | aspheric | 1.5181 | 0.3275 | 1.67 | 20.4 | 0.2451 |
| S4 | aspheric | 1.5878 | 0.4038 | | | 1.0961 |
| STO | spherical | infinite | 0.1094 | | | |

TABLE 19-continued

| Surface number | Surface type | Radius of curvature | Thickness | Material Refractive index | Abbe number | Conic coefficient |
|---|---|---|---|---|---|---|
| S5 | aspheric | 2.3539 | 0.5710 | 1.55 | 56.1 | 2.4372 |
| S6 | aspheric | −1.6199 | 0.1205 | | | 2.1991 |
| S7 | aspheric | 2.3805 | 0.2500 | 1.67 | 20.4 | −95.0000 |
| S8 | aspheric | 1.1657 | 0.0842 | | | −12.8263 |
| S9 | aspheric | 5.7973 | 0.6166 | 1.55 | 56.1 | 5.0000 |
| S10 | aspheric | −1.1834 | 0.5820 | | | −0.3164 |
| S11 | aspheric | −1.7387 | 0.2500 | 1.54 | 55.7 | −5.2193 |
| S12 | aspheric | 11.3066 | 0.3783 | | | −95.0000 |
| S13 | spherical | infinite | 0.2100 | 1.52 | 64.2 | |
| S14 | spherical | infinite | 0.3679 | | | |
| S15 | spherical | infinite | infinite | | | |

As can be seen from Table 19, in embodiment 7, the object-side surface and the image-side surface of any one of the first lens E1 to the sixth lens E6 are aspheric. Table 20 below shows high-order coefficients applicable to each aspheric surface in embodiment 7, wherein the surface shape of each aspheric surface can be defined by the formula (1) given in the above embodiment 1

TABLE 20

| Surface number | A4 | A6 | A8 | A10 | A12 |
|---|---|---|---|---|---|
| S1 | 3.4079E−01 | −3.5426E−01 | 2.8982E−01 | −1.6008E−01 | 5.6397E−02 |
| S2 | 1.0242E+00 | −1.5258E+00 | 2.4843E+00 | −3.3047E+00 | 3.2121E+00 |
| S3 | 1.7401E−01 | −1.1341E+00 | 2.8017E+00 | −5.9965E+00 | 7.7758E+00 |
| S4 | 1.0256E−01 | −9.3679E−01 | 4.5289E+00 | −1.6194E+01 | 3.9464E+01 |
| S5 | −4.7068E−03 | −1.0850E−01 | −2.1509E−01 | 8.1036E+00 | −7.5481E+01 |
| S6 | −9.9874E−01 | 6.9680E+00 | −3.7951E+01 | 1.6572E+02 | −5.3894E+02 |
| S7 | −1.2260E+00 | 2.4192E+00 | 5.5191E+00 | −6.0286E+01 | 2.1637E+02 |
| S8 | −4.9876E−01 | 5.8469E−01 | 3.8075E+00 | −2.0332E+01 | 4.8260E+01 |
| S9 | 1.3861E−01 | −1.0114E+00 | 4.9388E+00 | −1.4085E+01 | 2.5045E+01 |
| S10 | 3.4988E−01 | −2.0011E−01 | −2.9543E−01 | 1.9255E+00 | −4.3381E+00 |
| S11 | 2.9518E−01 | −8.0901E−01 | −2.0062E+00 | 1.0719E+01 | −2.1679E+01 |
| S12 | 3.4854E−01 | −1.2982E+00 | 2.0357E+00 | −2.0241E+00 | 1.3255E+00 |

| Surface number | A14 | A16 | A18 | A20 |
|---|---|---|---|---|
| S1 | −1.1302E−02 | 9.8456E−04 | 0.0000E+00 | 0.0000E+00 |
| S2 | −1.8812E+00 | 4.4958E−01 | 0.0000E+00 | 0.0000E+00 |
| S3 | −5.1429E+00 | 1.3286E+00 | 0.0000E+00 | 0.0000E+00 |
| S4 | −5.2743E+01 | 3.3890E+01 | 0.0000E+00 | 0.0000E+00 |
| S5 | 3.4940E+02 | −9.0188E+02 | 1.2341E+03 | −6.9952E+02 |
| S6 | 1.2112E+03 | −1.7497E+03 | 1.4525E+03 | −5.2559E+02 |
| S7 | −4.4316E+02 | 5.3988E+02 | −3.6153E+02 | 1.0245E+02 |
| S8 | −6.6965E+01 | 5.5631E+01 | −2.5678E+01 | 5.0960E+00 |
| S9 | −2.8045E+01 | 1.9259E+01 | −7.4292E+00 | 1.2342E+00 |
| S10 | 5.6270E+00 | −4.1213E+00 | 1.5569E+00 | −2.3507E−01 |
| S11 | 2.4414E+01 | −1.5817E+01 | 5.4946E+00 | −7.9158E−01 |
| S12 | −5.6235E−01 | 1.4812E−01 | −2.2007E−02 | 1.4114E−03 |

Table 21 shows the total effective focal length f of the camera lens assembly, and the effective focal length f1 to f6 of respective lens, half of the diagonal length ImgH of an effective pixel area on the image plane S15 and the total track length TTL of the camera lens assembly in embodiment 7.

TABLE 21

| f (mm) | 1.85 |
|---|---|
| f1 (mm) | −3.15 |
| f2 (mm) | 18.93 |
| f3 (mm) | 1.85 |
| f4 (mm) | −3.74 |

TABLE 21-continued

| f5 (mm) | 1.86 |
|---|---|
| f6 (mm) | −2.79 |
| ImgH (mm) | 2.89 |
| TTL (mm) | 5.11 |
| HFOV (°) | 58.5 |

Figure 14C:
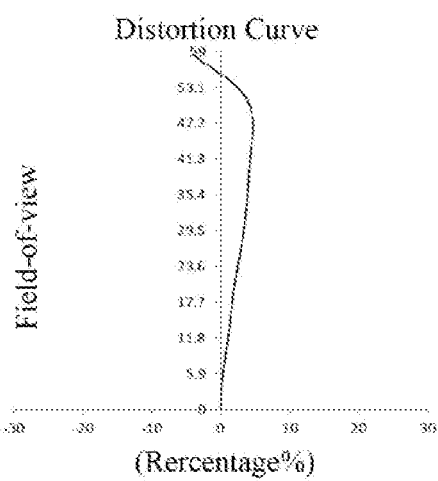
Figure 14D:
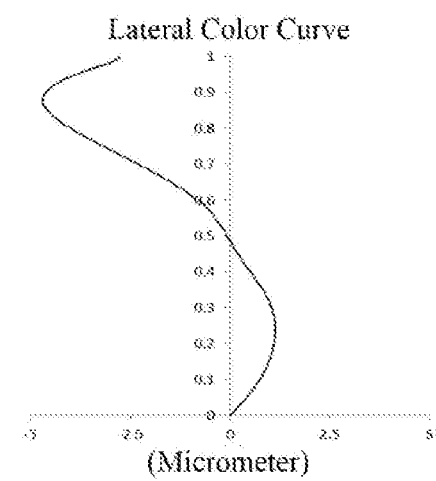

FIG. 14A illustrates a longitudinal aberration curve of the camera lens assembly according to embodiment 7, representing deviations of focal points converged by light of different wavelengths after passing through the camera lens assembly. FIG. 14B illustrates an astigmatism curve of the camera lens assembly according to embodiment 7, representing a curvature of a tangential plane and a curvature of a sagittal plane. FIG. 14C illustrates a distortion curve of the camera lens assembly according to embodiment 7, representing amounts of distortion at different viewing angles. FIG. 14D illustrates a lateral color curve of the camera lens assembly according to embodiment 7, representing deviations of different image heights on an image plane after light passes through the camera lens assembly. It can be seen from FIG. 14A to FIG. 14D that the camera lens assembly provided in embodiment 7 can achieve good image quality.

In view of the above, embodiments 1 to 7 respectively satisfy the relationship shown in Table 22.

TABLE 22

| Formula | Embodiment | | | | | | |
| | 1 | 2 | 3 | 4 | 5 | 6 | 7 |
|---|---|---|---|---|---|---|---|
| f/CT3 | 3.97 | 3.94 | 3.94 | 3.80 | 3.58 | 3.26 | 3.23 |
| ΣCT × (R3 + R4) | 10.68 | 10.26 | 9.34 | 8.89 | 8.84 | 8.08 | 7.63 |
| TTL/ImgH | 1.77 | 1.77 | 1.77 | 1.79 | 1.77 | 1.77 | 1.77 |
| \|f/f34\| + \|f/f56\| | 1.37 | 1.34 | 1.34 | 1.35 | 1.26 | 1.26 | 1.24 |
| DT12/SAG12 | 2.14 | 2.42 | 2.01 | 2.02 | 2.44 | 1.96 | 2.03 |

TABLE 22-continued

| Formula | Embodiment | | | | | | |
|---|---|---|---|---|---|---|---|
| | 1 | 2 | 3 | 4 | 5 | 6 | 7 |
| f/f123 | 1.44 | 1.48 | 1.28 | 1.20 | 1.15 | 1.44 | 1.15 |
| \|SAG52\|/CT5 | 0.60 | 0.58 | 0.63 | 0.61 | 0.54 | 0.56 | 0.33 |
| CT3/CT6 | 1.09 | 1.11 | 1.13 | 1.10 | 0.88 | 1.31 | 2.28 |
| \|R5 − R8\|/\|R5 + R8\| | 0.03 | 0.04 | 0.04 | 0.03 | 0.09 | 0.23 | 0.34 |
| ImgH/DT52 | 2.25 | 2.65 | 2.28 | 2.37 | 2.63 | 2.34 | 2.49 |
| HFOV (°) | 58.5 | 58.5 | 58.4 | 58.5 | 58.5 | 58.6 | 58.1 |
| T45/f45 × 10 | 0.17 | 0.17 | 0.22 | 0.14 | 0.24 | 0.37 | 0.26 |

The present disclosure further provides an imaging apparatus, having a photosensitive element which may be a photosensitive charge-coupled device (CCD) or a complementary metal-oxide semiconductor (CMOS). The imaging apparatus may be an independent imaging device such as a digital camera, or may be an imaging module integrated in a mobile electronic device such as a mobile phone. The imaging apparatus is equipped with the camera lens assembly described above.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A camera lens assembly, comprising: a first lens, a second lens, a third lens, a fourth lens, a fifth lens and a sixth lens, sequentially from an object side to an image side along an optical axis,
wherein,
the first lens has a negative refractive power,
the second lens has a positive refractive power, an object-side surface of the second lens is a convex surface and an image-side surface of the second lens is a concave surface;
the third lens has a positive refractive power, and an object-side surface of the third lens is a convex surface;
the fourth lens has a negative refractive power, and an image-side surface of the fourth lens is a concave surface;
the fifth lens has a positive refractive power;
the sixth lens has a negative refractive power, and at least one of an object-side surface and an image-side surface of the sixth lens has an inflection point;
the camera lens assembly satisfies:

$HFOV \geq 55°$;

$0 < T45/f45 \times 10 < 0.5$; and $1 < ImgH/DT52 < 4$, wherein HFOV is half of a maximal field-of-view of the camera lens assembly, T45 is a spaced distance on the optical axis between the fourth lens and the fifth lens, f45 is a combined focal length of the fourth lens and the fifth lens, ImgH is half of a diagonal length of an effective pixel area on an image plane of a camera lens assembly, and DT52 is a maximum effective radius of an image-side surface of the fifth lens.

2. The camera lens assembly according to claim 1, wherein the camera lens assembly satisfies: $3 < f/CT3 < 5$,
where f is a total effective focal length of the camera lens assembly and CT3 is a center thickness of the third lens on the optical axis.

3. The camera lens assembly according to claim 1, wherein the camera lens assembly satisfies: $7 < \Sigma CT \times (R3 + R4) < 11$,
where $\Sigma CT$ is a sum of center thicknesses of the first lens to the sixth lens on the optical axis, R3 is a radius of curvature of the object-side surface of the second lens, and R4 is a radius of curvature of the image-side surface of the second lens.

4. The camera lens assembly according to claim 1, wherein the camera lens assembly satisfies: $1 < DT12/SAG12 < 3$,
where DT12 is a maximum effective radius of an image-side surface of the first lens and SAG12 is an axial distance from an intersection of the image-side surface of the first lens and the optical axis to an apex of an effective radius of the image-side surface of the first lens.

5. The camera lens assembly according to claim 1, wherein the camera lens assembly satisfies: $|SAG52|/CT5 < 1$,
where SAG52 is an axial distance from an intersection of an image-side surface of the fifth lens and the optical axis to an apex of an effective radius of the image-side surface of the fifth lens, and CT5 is a center thickness of the fifth lens on the optical axis.

6. The camera lens assembly according to claim 1, wherein the camera lens assembly satisfies: $0 < CT3/CT6 < 3$,
where CT3 is a center thickness of the third lens on the optical axis, and CT6 is a center thickness of the sixth lens on the optical axis.

7. The camera lens assembly according to claim 1, wherein the camera lens assembly satisfies: $|R5-R8|/|R5+R8| < 1$,
where R5 is a radius of curvature of the object-side surface of the third lens, and R8 is a radius of curvature of the image-side surface of the fourth lens.

8. The camera lens assembly according to claim 1, wherein the camera lens assembly satisfies: $1.6 < TTL/ImgH < 2$,
where TTL is a distance on the optical axis from an object-side surface of the first lens to an image plane of the camera lens assembly, and ImgH is half of a diagonal length of an effective pixel area on the image plane of the camera lens assembly.

9. The camera lens assembly according to claim 1, wherein the camera lens assembly satisfies: $|f/f34|+|f/f56|<2$,
where f is a total effective focal length of the camera lens assembly, f34 is a combined focal length of the third lens and the fourth lens, and f56 is a combined focal length of the fifth lens and the sixth lens.

10. The camera lens assembly according to claim 1, wherein the camera lens assembly satisfies: $f/f123 < 2.5$,
where f is a total effective focal length of the camera lens assembly, and f123 is a combined focal length of the first lens, the second lens and the third lens.

11. A camera lens assembly, comprising, a first lens, a second lens, a third lens, a fourth lens, a fifth lens and a sixth lens, sequentially from an object side to an image side along an optical axis, wherein, the first lens has a negative refractive power, the second lens has a positive refractive power, an object-side surface of the second lens is a convex surface and an image-side surface of the second lens is a concave surface;

the third lens has a positive refractive power, and an object-side surface of the third lens is a convex surface;

the fourth lens has a negative refractive power, and an image-side surface of the fourth lens is a concave surface;

the fifth lens has a positive refractive power;

the sixth lens has a negative refractive power, and at least one of an object-side surface and an image-side surface of the sixth lens has an inflection point;

the camera lens assembly satisfies:

$$3 < f/CT3 < 5;$$

$$1.6 < TTL/ImgH < 2;\text{ and}$$

$$1 < ImgH/DT52 < 4,$$

where f is a total effective focal length of the camera lens assembly, CT3 is a center thickness of the third lens on the optical axis, TTL is a distance on the optical axis from an object-side surface of the first lens to an image plane of the camera lens assembly, ImgH is half of a diagonal length of an effective pixel area on the image plane of the camera lens assembly, and DT52 is a maximum effective radius of an image-side surface of the fifth lens.

12. The camera lens assembly according to claim 11, wherein the camera lens assembly satisfies: |R5−R8|/|R5+R8|<1, where R5 is a radius of curvature of the object-side surface of the third lens, and R8 is a radius of curvature of the image-side surface of the fourth lens.

13. The camera lens assembly according to claim 11, wherein the camera lens assembly satisfies: HFOV≥55°, where HFOV is half of a maximal field-of-view of the camera lens assembly.

14. The camera lens assembly according to claim 11, wherein the camera lens assembly satisfies: 7<ΣCT×(R3−R4)<11, where ΣCT is a sum of center thicknesses of the first lens to the sixth lens on the optical axis, R3 is a radius of curvature of the object-side surface of the second lens, and R4 is a radius of curvature of the image-side surface of the second lens.

15. The camera lens assembly according to claim 11, wherein the camera lens assembly satisfies: f/f123<2.5, where f is the total effective focal length of the camera lens assembly, and f123 is a combined focal length of the first lens, the second lens and the third lens.

16. The camera lens assembly according to claim 11, wherein the camera lens assembly satisfies: 1<DT12/SAG12<3, where DT12 is a maximum effective radius of an image-side surface of the first lens, and SAG12 is an axial distance from an intersection of the image-side surface of the first lens and the optical axis to an apex of an effective radius of the image-side surface of the first lens.

17. The camera lens assembly according to claim 11, wherein the camera lens assembly satisfies: |f/f34|+|f/f56|<2, where f is the total effective focal length of the camera lens assembly, f34 is a combined focal length of the third lens and the fourth lens, and f56 is a combined focal length of the fifth lens and the sixth lens.

18. The camera lens assembly according to claim 11, wherein the camera lens assembly satisfies: |SAG52|/CT5<1, where SAG52 is an axial distance from an intersection of an image-side surface of the fifth lens and the optical axis to an apex of an effective radius of the image-side surface of the fifth lens, and CT5 is a center thickness of the fifth lens on the optical axis.

* * * * *